(12) United States Patent
Shigenaga

(10) Patent No.: US 6,965,382 B2
(45) Date of Patent: Nov. 15, 2005

(54) GRAPHIC IMAGE RENDERING APPARATUS

(75) Inventor: Satoshi Shigenaga, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 69 days.

(21) Appl. No.: 10/376,291

(22) Filed: Mar. 3, 2003

(65) Prior Publication Data

US 2003/0193507 A1 Oct. 16, 2003

(30) Foreign Application Priority Data

Apr. 15, 2002 (JP) .............................. 2002-111905

(51) Int. Cl.[7] .............................. G09G 5/00; G09G 5/36
(52) U.S. Cl. ...................... 345/586; 345/581; 345/536; 345/537; 345/545
(58) Field of Search .............................. 345/418, 422, 345/428, 581, 582, 583, 586, 606, 628, 501, 345/522, 530, 531, 536, 537, 545, 546, 506, 345/505, 533; 382/300, 303–305

(56) References Cited

U.S. PATENT DOCUMENTS

| | | | |
|---|---|---|---|
| 5,594,679 A | 1/1997 | Iwata | |
| 5,892,518 A | 4/1999 | Mizobata et al. | |
| 6,138,136 A | 10/2000 | Bauer et al. | |
| 6,157,386 A * | 12/2000 | Wilde | ......................... 345/587 |
| 6,211,885 B1 | 4/2001 | Izawa | |
| 6,259,455 B1 * | 7/2001 | Shaw et al. | .................. 345/582 |
| 6,275,234 B1 | 8/2001 | Iwaki | |
| 6,292,191 B1 * | 9/2001 | Vaswani et al. | ............ 345/582 |
| 2003/0206179 A1 * | 11/2003 | Deering | ...................... 345/589 |

FOREIGN PATENT DOCUMENTS

| | | |
|---|---|---|
| CN | 1108865 A | 9/1995 |
| JP | 11-195134 | 7/1999 |

OTHER PUBLICATIONS

Foley, et al. "Computer Graphics: Principles and Practice." (Mar. 23, 2001) pp. 734-735, 738-741. (In Japanese with English translation from p. 734, line 2 to p. 735, line 4.).

* cited by examiner

Primary Examiner—Matthew C. Bella
Assistant Examiner—Wesner Sajous
(74) Attorney, Agent, or Firm—McDermott Will & Emery LLP

(57) ABSTRACT

By making it possible to freely change calculations of as well as variables that are input into the same calculation circuits, dedicated circuits corresponding to rendering functions become unnecessary, and in order to realize multi-functional rendering with circuitry of a small scale, a graphic image rendering apparatus includes a rendering information generation portion that generates rendering parameters corresponding to X and Y coordinates of pixels constituting a graphic image, a pixel calculation portion that, for each pixel, makes a selection as appropriate from the rendering parameters and a constant and performs a calculation, and a memory interface portion that writes a calculation result of the pixel calculation portion into a frame memory.

7 Claims, 18 Drawing Sheets

FIG. 2

| A to D input selection signals | associated calculation unit input |
|---|---|
| 001 | texture data |
| 010 | R, G, B for each pixel |
| 011 | α for each pixel |
| 100 | constant 0 |
| 101 | constant 1 |
| 110 | constant RGB I |
| 111 | constant RGB II |

FIG. 4

| E to H input selection signals | associated calculation unit input |
|---|---|
| 000 | first pixel data |
| 001 | texture data |
| 010 | R, G, B for each pixel |
| 011 | α for each pixel |
| 100 | constant 0 |
| 101 | constant 1 |
| 110 | constant RGB I |
| 111 | constant RGB II |

FIG. 6

| E to H input selection signals | associated calculation unit input |
|---|---|
| 0000 | first pixel data |
| 0001 | texture data |
| 0010 | R, G, B for each pixel |
| 0011 | α for each pixel |
| 0100 | constant 0 |
| 0101 | constant 1 |
| 0110 | constant RGB I |
| 0111 | constant RGB II |
| 1000 | frame data |

FIG. 8

| A to D input selection signals | associated calculation unit input |
|---|---|
| 000 | frame data |
| 001 | texture data |
| 010 | R, G, B for each pixel |
| 011 | α for each pixel |
| 100 | constant 0 |
| 101 | constant 1 |
| 110 | constant RGB I |
| 111 | constant RGB II |

FIG. 11

| rendering function | rendering command 50 | first calculation mode signal 41 | | | | | second calculation mode signal 31 | | | | |
|---|---|---|---|---|---|---|---|---|---|---|---|
| | | A input conversion | A input selection | B input selection | C input selection | D input selection | E input conversion | E input selection | F input selection | G input selection | H input selection |
| single color | 00 | 0 | 110 | 101 | 100 | 100 | 0 | 0000 | 0101 | 0100 | 0100 |
| texture mapping | 01 | 0 | 001 | 101 | 100 | 100 | 0 | 0000 | 0101 | 0100 | 0100 |
| gouraud shading | 10 | 0 | 001 | 010 | 110 | 101 | 0 | 0000 | 0101 | 0100 | 0100 |
| alpha blending | 11 | 0 | 001 | 010 | 110 | 101 | 1 | 0011 | 0000 | 0011 | 1000 |

GRAPHIC IMAGE RENDERING APPARATUS

BACKGROUND OF THE INVENTION

The present invention relates to apparatuses that render graphic images in the field of computer graphics, and in particular to apparatuses that calculate the color of pixels constituting graphic images.

In recent years, as technology for game consoles and car navigation systems advances, graphic images are not only rendered in a single color, but the pixels constituting graphic images are subjected to various processes, such as performing texture mapping, gouraud shading, in which the colors between the vertices of the graphic image are interpolated, or alpha blending, in which a transparency process with the background color is performed.

Details concerning texture mapping and gouraud shading can be looked up in "Computer Graphics: Principles and Practice" by James D. Foley, Andries van Dam, Steven K. Feiner, and John F. Hughes, translated by Yoshio Sato.

FIG. 16 shows a conventional configuration for subjecting a graphic image to texture mapping and gouraud shading. Based on the X and Y coordinates, texture coordinates U and V, as well as R, G and B indicating the brightness given to the vertices of the graphic image that is to be rendered, a pixel information generation portion 1 generates U, V, as well as R, G and B for the X and Y coordinates of each pixel constituting the graphic image. It should be noted that R, G and B are taken to be in the range of 0.0 to 1.0.

Taking the triangular shape shown in FIG. 17 as an example, the following is an explanation of the process by which the pixel information generation portion 1 generates the value of each pixel constituting the graphic image. The triangle shown in FIG. 17 has been given (X, Y, U, V, R, G, B) at its vertices. At vertex P1, (X, Y, U, V, R, G, B) is (X1, Y1, U1, V1, R1, G1, B1), at vertex P2, (X, Y, U, V, R, G, B) is (X2, Y2, U2, V2, R2, G2, B2), and at vertex P3, (X, Y, U, V, R, G, B) is (X3, Y3, U3, V3, R3, G3, B3). Y2 and Y3 are assumed to be equal.

FIG. 18 illustrates the principle of the pixel information generation process. This process begins from the vertex P1 where the Y coordinate is smallest, and determines the X coordinates of the left side and the right side of the graphic image for each Y coordinate. In the course of this, also the values of U, V, R, G and B corresponding to the left side are determined. After the values of the left side of the currently processed Y coordinate have been determined, the X coordinates are incremented parallel to the X axis from the X coordinate of the left side to the X coordinate on the right side, while determining the corresponding U, V, R, G and B values. This process is performed up to Y2, which is the last Y coordinate, at which the process is terminated.

The following is a detailed explanation of the flow of the pixel information generation process, referring to the flow-chart in FIG. 19. First, the parameters shown in that figure are defined as follows:

$dXL/dY = (X2-X1)/(Y2-Y1)$ $dXR/dY = (X3-X1)/(Y2-Y1)$ $dU/dY = (U2-U1)/(Y2-Y1)$ $dU/dX = (U3-U2)/(X3-X2)$ $dV/dY = (V2-V1)/(Y2-Y1)$ $dV/dX = (V3-V2)/(X3-X2)$ $dR/dY = (R2-R1)/(Y2-Y1)$ $dR/dX = (R3-R1)/(X3-X2)$ $dG/dY = (G2-G1)/(Y2-Y1)$ $dG/dX = (G3-G2)/(X3-X2)$ $dB/dY = (B2-B1)/(Y2-Y1)$ $dB/dX = (B3-B2)/(X3-X2)$

It should be noted that these parameters can be calculated internally in the pixel information generation portion 1, or they can be previously calculated externally and then given to the pixel information generation portion 1. Furthermore, XL, UL, VL, RL, GL and BL are variables for storing the values at the left edge, and are here referred to as "left edge variables." XR is a variable for storing the X coordinate at the right edge, and is here referred to as "right edge variable." Furthermore, X, Y, U, V, R, G and B are variables for storing the values of the pixels constituting the graphic image, and are here referred to as "pixel variables." These values are output from the pixel information generation portion 1. The afore-mentioned variables can be stored in storage elements, such as registers in circuitry.

When the storage begins, at Step S1, the left edge variables and the pixel variables of the Y coordinate are respectively set to the values for the vertex P1, and the procedure advances to Step S2. At Step S2, the pixel variables are respectively set to the values stored in the left edge variables, and the procedure advances to Step S3. The values that are stored into the pixel variables at Step S2 are output from the pixel information generation portion 1 as the values of the pixels constituting the left edge of the graphic image.

At Step S3, if the pixel variable of the X coordinate is equal to the right edge variable, then the procedure advances to Step S5, and if it is not equal, then it advances to Step S4. At Step S4, the pixel variable of the X coordinate is incremented, and a displacement in X direction is respectively added to the pixel variables U, V, R, G and B, and then the procedure returns to Step S3. The values that are stored in the pixel variables at Step S4 are output from the pixel information generation portion 1 as the values of the pixels constituting the graphic image except for the left edge.

At Step S5, if the pixel variable of the Y coordinate is equal to the Y coordinate of the vertex P2, then the procedure is terminated, and if it is not equal, then the procedure advances to Step S6. At Step S6, the pixel variable of the Y coordinate is incremented, and a displacement in Y direction is respectively added to the left edge variables, and then the procedure returns to Step S2.

Thus, the pixel information generation portion 1 generates X, Y, U, V, R, G and B of each pixel constituting the graphic image.

In FIG. 16, a texture memory 2, which is the memory where the texture is stored, outputs texture data in correspondence with the U and V that are output from the pixel information generation portion 1. These texture data include R, G and B in each set of data.

A multiplier 3 multiplies the R, G and B output from the pixel information generation portion 1 respectively with the R, G and B of the texture data.

An adder 4 adds the R, G and B output from the multiplier 3 respectively to the R, G and B of a bias value, and outputs pixel data constituted by the R, G and B that determine the color of a pixel of the graphic image. If R, G or B after the addition exceed 1.0, then that value is saturated to 1.0.

The frame memory 5, which is the memory for rendering the graphic image, stores the pixel data constituted by R, G and B. The graphic image information built up in the frame memory 5 is displayed on a display (not shown in the drawings).

A memory interface portion 6 writes into the frame memory 5 the pixel data at the locations corresponding to the X and Y coordinates that are output by the pixel information generation portion 1.

However, when trying to add alpha blending as a new function to a conventional configuration performing texture mapping and gouraud shading on a graphic image, the calculation (texture)×(R, G, B)+(bias value)

which is necessary for gouraud shading, becomes (1−transparency)×(texture)+(transparency)×(background value)

for alpha blending.

Thus, not only the calculation itself but also the variables that are input are different, so that in order to add an alpha blending function, a dedicated calculation circuit was necessary.

Providing a dedicated calculation circuit for each rendering function increases the scale of the circuitry, and there was the problem that the types of rendering functions could not be increased with circuitry of small scale.

It is thus an object of the present invention to solve these problems, and to provide a graphic image rendering apparatus that eliminates the need for dedicated circuitry for each function and that realizes multi-functional rendering with circuitry of a small scale.

SUMMARY OF THE INVENTION

To solve the above-described problems, a graphic image rendering apparatus in accordance with a first aspect of the present invention includes a rendering information generation portion that generates rendering parameters corresponding to X and Y coordinates of pixels constituting a graphic image; a pixel calculation portion that, for each pixel, makes a selection as appropriate from the rendering parameters and a constant to perform a calculation; and a memory interface portion that writes a calculation result of the pixel calculation portion into a frame memory.

A graphic image rendering apparatus in accordance with a second aspect of the present invention includes a rendering information generation portion that generates rendering parameters corresponding to X and Y coordinates of pixels constituting a graphic image; a plurality of pixel calculation portions that, in a first stage, for each pixel make a selection as appropriate from the rendering parameters and a constant to perform a calculation, and in stages following the first stage make a selection as appropriate from the rendering parameters, the constant, and a calculation result of the prior stage(s) to perform a calculation; and a memory interface portion that writes a calculation result of the pixel calculation portion of the last stage into a frame memory.

A graphic image rendering apparatus in accordance with a third aspect of the present invention includes a rendering information generation portion that generates rendering parameters corresponding to X and Y coordinates of pixels constituting a graphic image; a plurality of pixel calculation portions that, in a first stage, for each pixel make a selection as appropriate from the rendering parameters and a constant to perform a calculation, in stages following the first stage make a selection as appropriate from the rendering parameters, the constant, and a calculation result of the prior stage(s) to perform a calculation, and in the last stage, make a selection as appropriate from the rendering parameters, the constant, the calculation result of the prior stage(s), and frame data, which are pixel data in a frame memory that correspond to the coordinates of the pixel currently processed to perform a calculation; and a memory interface portion that reads the frame data from the frame memory and writes a calculation result of the pixel calculation portion of the last stage into the frame memory.

In that case, in accordance with a fourth aspect of the present invention, when rendering with more calculation stages than there are stages of pixel calculation portions, first a result calculated by the number of stages of pixel calculation portions may be built up in the frame memory, and then an additional calculation may be performed on the calculation result of up to the previous stage by reflecting in the pixel calculation portion of the last stage the frame data at the same rendering position.

A graphic image rendering apparatus in accordance with a fifth aspect of the present invention includes a rendering information generation portion that generates rendering parameters corresponding to X and Y coordinates of pixels constituting a graphic image; a plurality of pixel calculation portions that, in a first stage, for each pixel make a selection as appropriate from the rendering parameters, a constant and frame data to perform a calculation, and in stages following the first stage make a selection as appropriate from the rendering parameters, the constant, a calculation result of the prior stage(s) and the frame data to perform a calculation; and a memory interface portion that reads the frame data from the frame memory and writes a calculation result of the pixel calculation portion of the last stage into the frame memory.

In that case, in accordance with a sixth aspect of the present invention, when rendering with more calculation stages than there are stages of pixel calculation portions, first a result calculated by the number of stages of pixel calculation portions may be built up in the frame memory, and then an additional calculation may be performed on the calculation result of up to the previous stage by reflecting in each pixel calculation portion the frame data at the same rendering position.

A graphic image rendering apparatus in accordance with a seventh aspect of the present invention includes a working memory, which is an internal memory; a rendering information generation portion that generates rendering parameters corresponding to X and Y coordinates of pixels constituting a graphic image; a plurality of pixel calculation portions that, in a first stage, for each pixel make a selection as appropriate from the rendering parameters, a constant and working data, which are pixel data in a working memory that correspond to coordinates of a pixel currently processed, to perform a calculation, and in stages following the first stage make a selection as appropriate from the rendering parameters, the constant, a calculation result of the prior stage(s) and the working data to perform a calculation; a working memory interface portion that reads the working data from the working memory and writes a calculation result of the pixel calculation portion of the last stage into the working memory; and a frame memory interface portion that writes only a calculation result of the pixel calculation portion of the last stage into the frame memory.

In that case, in accordance with an eighth aspect of the present invention, when rendering with more calculation stages than there are stages of pixel calculation portions, first a result calculated by the number of stages of pixel calculation portions may be built up in the working memory, and then an additional calculation may be performed on the calculation result of up to the previous stage by reflecting in each pixel calculation portion the working data at the same rendering position.

Furthermore, in accordance with a ninth aspect of the present invention, the smallest X and Y coordinates of a rectangle circumscribing the graphic image to be rendered may be taken as an origin in the working memory, and the working memory interface portion may access the working memory after converting coordinates of the frame memory into coordinates of the working memory.

Furthermore, in accordance with a tenth aspect of the present invention, when using frame data for a calculation before rendering the image, then before starting the rendering of the graphic image the frame data of a region of a rectangle circumscribing the graphic image to be rendered may be transferred in advance from the frame memory to the working memory.

A graphic image rendering apparatus in accordance with an eleventh aspect of the present invention includes a first and a second working memory, which are internal memories; a rendering information generation portion that generates rendering parameters corresponding to X and Y coordinates of pixels constituting a graphic image; a plurality of pixel calculation portions that, in a first stage, for each pixel make a selection as appropriate from the rendering parameters, a constant and working data from the first and second working memory to perform a calculation, and in stages following the first stage make a selection as appropriate from the rendering parameters, the constant, a calculation result of the prior stage(s) and the working data to perform a calculation; a working memory interface portion that, while a rendering calculation process is performed, reads the working data from the first or second working memory, writes a calculation result of the pixel calculation portion of the last stage into the first or second working memory, and in parallel to the rendering calculation process, writes into the first or the second working memory all frame data in a rectangular region circumscribing the graphic image to be rendered that have been read from the frame memory, and reads from the first or the second working memory all working data in a rectangular region circumscribing the graphic image for which calculation has been finished; a frame memory interface portion that reads from the frame memory all frame data in the rectangular region circumscribing the graphic image to be rendered, and writes into a rendering position of the frame memory all working data in the rectangular region circumscribing the graphic image that have been read from the first or second working memory and for which calculation has been finished; and a rectangle transfer control portion that controls the working memory interface portion or the frame memory interface portion with regard to transferring the rectangular region circumscribing the graphic image, and determines the allocation of the rendering calculation process and the circumscribing rectangle transfer process with regard to the first and second working memories.

In that case, in accordance with a twelfth aspect of the present invention, when rendering with more calculation stages than there are stages of pixel calculation portions, first a result calculated by the number of stages of pixel calculation portions may be built up in the first or second working memory, and then an additional calculation may be performed on the calculation result of up to the previous stage by reflecting in each pixel calculation portion the working data at the same rendering position.

Furthermore, in accordance with a thirteenth aspect of the present invention, when using the first working memory, the smallest X and Y coordinates of the rectangle circumscribing the graphic image to be rendered may be taken as an origin of the first working memory, and the working memory interface portion may access the first working memory after converting coordinates of the frame memory into coordinates of the first working memory, and when using the second working memory, the smallest X and Y coordinates of the rectangle circumscribing the graphic image to be rendered may be taken as an origin of the second working memory, and the working memory interface portion may access the second working memory after converting coordinates of the frame memory into coordinates of the second working memory.

Furthermore, in accordance with a fourteenth aspect of the present invention, it may be determined in advance whether the rectangles circumscribing two graphic images to be rendered successively overlap, and if they overlap, the latter graphic image may be moved down in the rendering order so that the rectangles circumscribing two graphic images to be rendered successively do not overlap.

Furthermore, in accordance with a fifteenth aspect of the present invention, the graphic image rendering apparatus may further include a calculation mode signal supply portion that supplies to the pixel calculation portion(s) a calculation mode signal for selecting the parameters that the pixel calculation portion(s) use for their calculation, based on a rendering command encoded for each rendering function.

In accordance with the present invention, the details of the calculation and the input variables can be changed freely using the same calculation circuit, so that dedicated calculation circuits for each rendering function are unnecessary, and multi-functional rendering becomes possible with a circuit of a small scale.

Furthermore, if a plurality of calculation circuits are provided and the calculation result of prior stages is reflected in the calculation of latter stages, then it is possible to render with even more functions.

Moreover, by employing multiple stages of calculations, the scale of the circuitry increases, whereas by reading calculation results from the frame memory and reflecting them in the next calculation, multi-functional rendering becomes possible even with few stages of calculations circuits.

Furthermore, by employing multiple stages of calculations, the settings for the calculation circuits are increased, thus complicating the control, whereas performing the settings for the calculation circuits based on a rendering command with little information content, the time for preparations and settings of the rendering parameters performed on the outside can be shortened.

By building up intermediate calculation results not in the low-speed frame memory but in a high-speed working memory when performing multi-stage calculations, the calculation process can be carried out at high speed.

Furthermore, by providing two working memories and performing the rendering calculation process for one graphic image and the circumscribing rectangle region transfer for another graphic image with in parallel separate working memories, a plurality of graphic images can be rendered at high speed.

BRIEF DESCRIPTION OF THE DRAWINGS

FIG. 2 illustrates the association with which the calculation input selection portions in Embodiment 1 of the present invention select the input values for the calculation units.

FIG. 4 illustrates the association with which the calculation input selection portions in Embodiment 2 of the present invention select the input values for the calculation units.

FIG. 6 illustrates the association with which the calculation input selection portions in Embodiment 3 of the present invention select the input values for the calculation units.

FIG. 8 illustrates the association with which the calculation input selection portions in Embodiment 4 of the present invention select the input values for the calculation units.

FIG. 11 shows an example of the assignment of the rendering command for each rendering function to the first calculation mode signal and the second calculation mode signal.

DETAILED DESCRIPTION OF THE INVENTION

Embodiment 1

Figure 1:
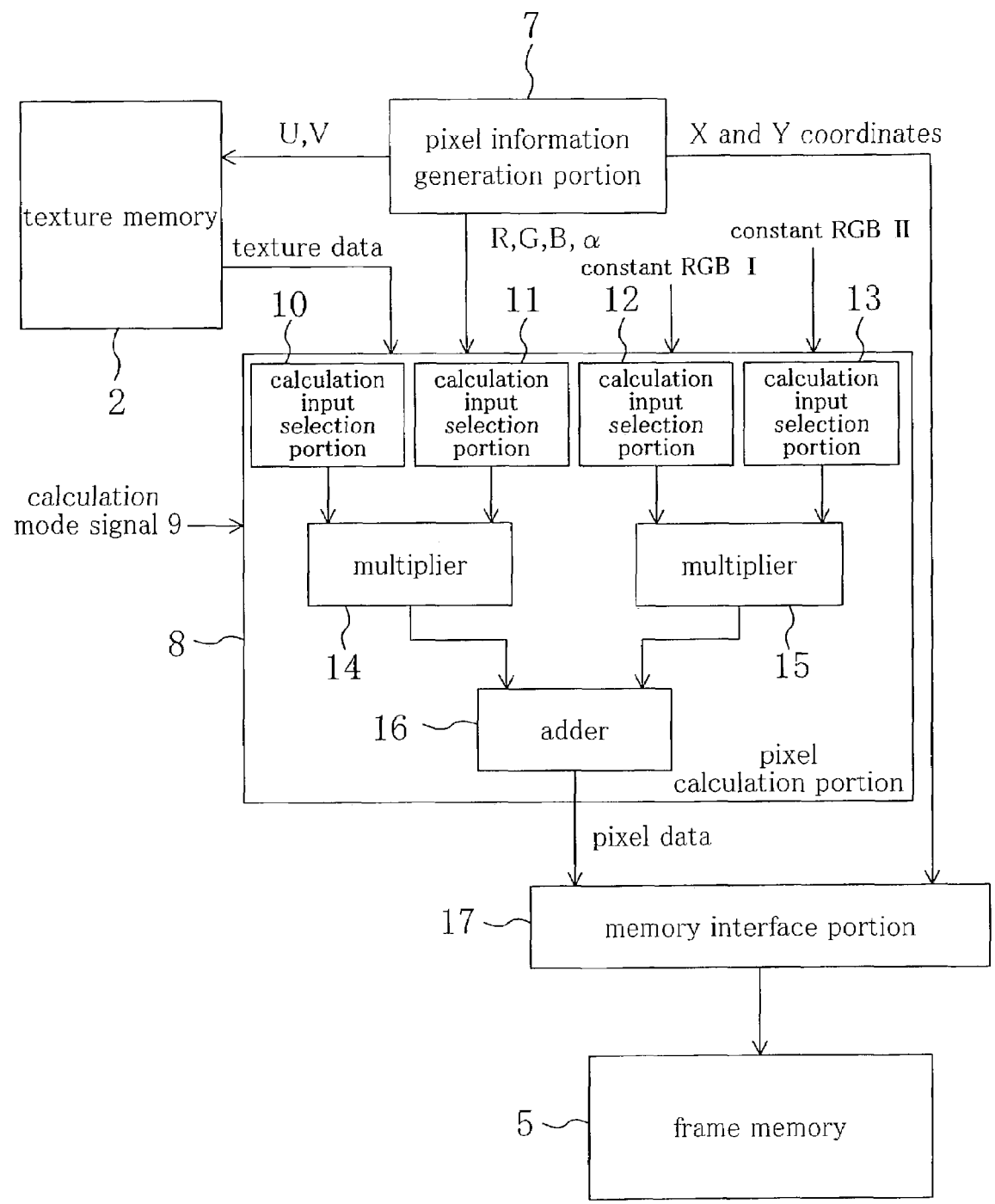
FIG. 1 is a block diagram showing the configuration of a graphic image rendering apparatus in accordance with Embodiment 1 of the present invention.

The following is a detailed description of Embodiment 1 of the present invention. FIG. 1 is a block diagram showing the configuration of a graphic image rendering apparatus in accordance with Embodiment 1.

Figure 16:
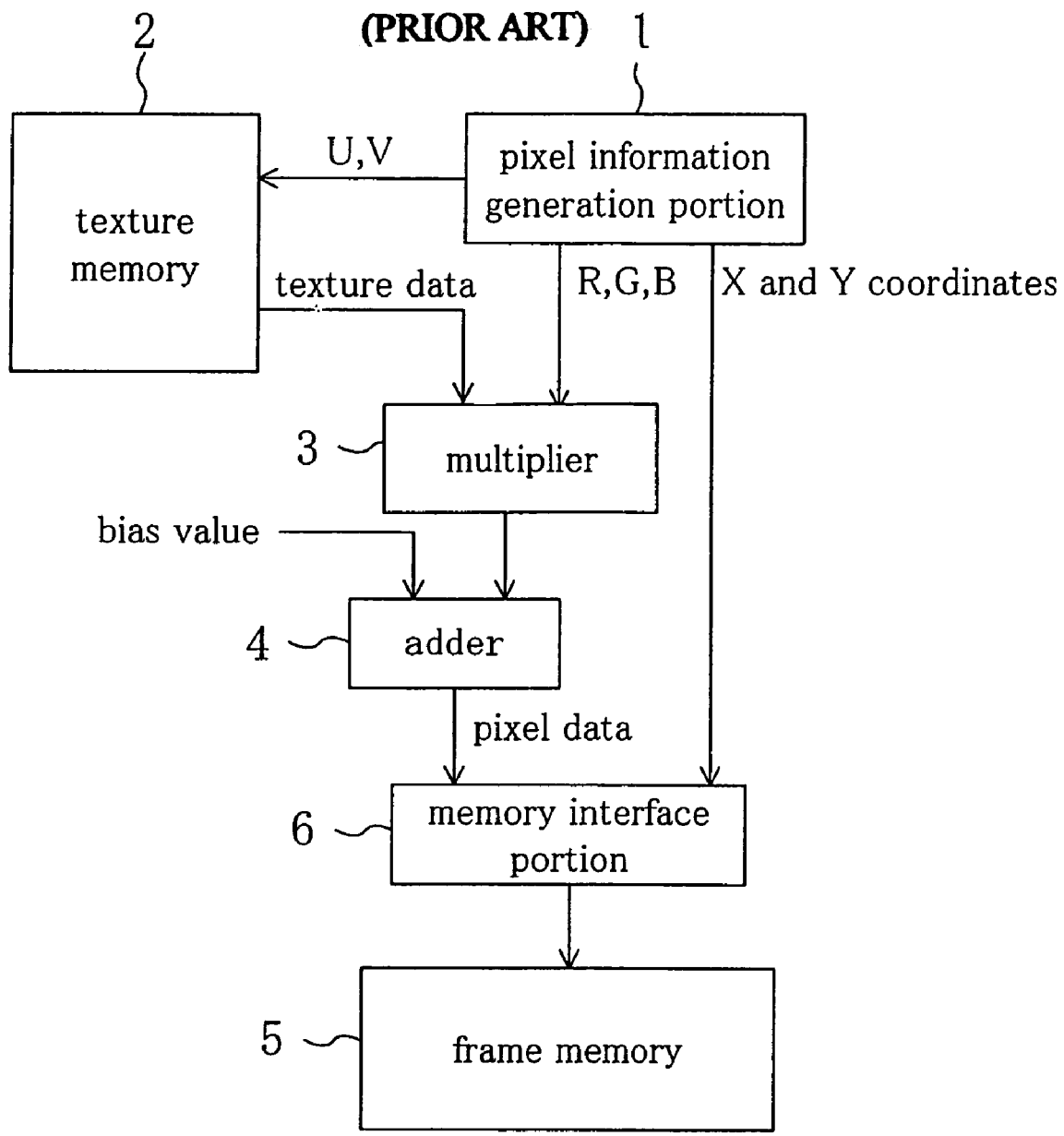
FIG. 16 shows a conventional configuration for subjecting a graphic image to texture mapping and gouraud shading.
Figure 17:
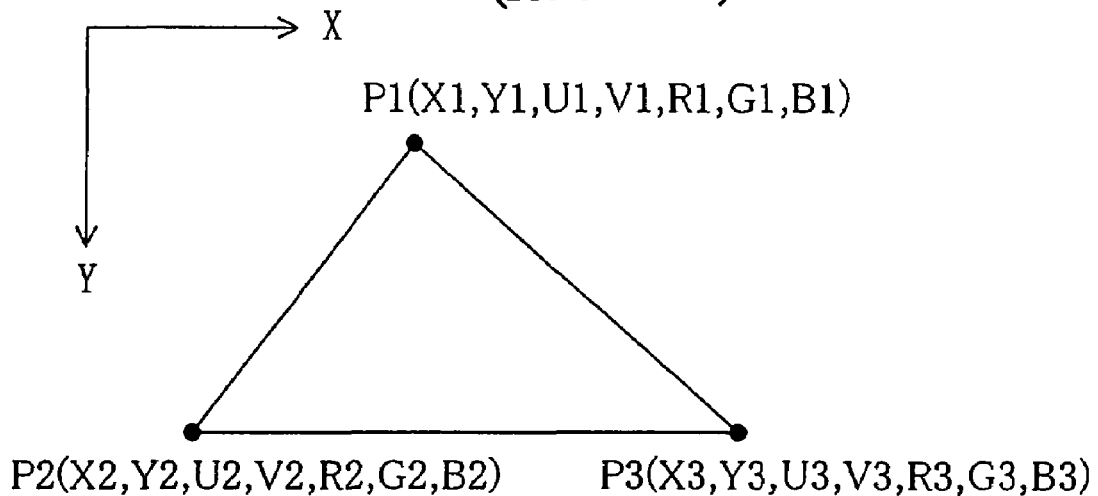
FIG. 17 illustrates a triangle to be rendered.
Figure 18:
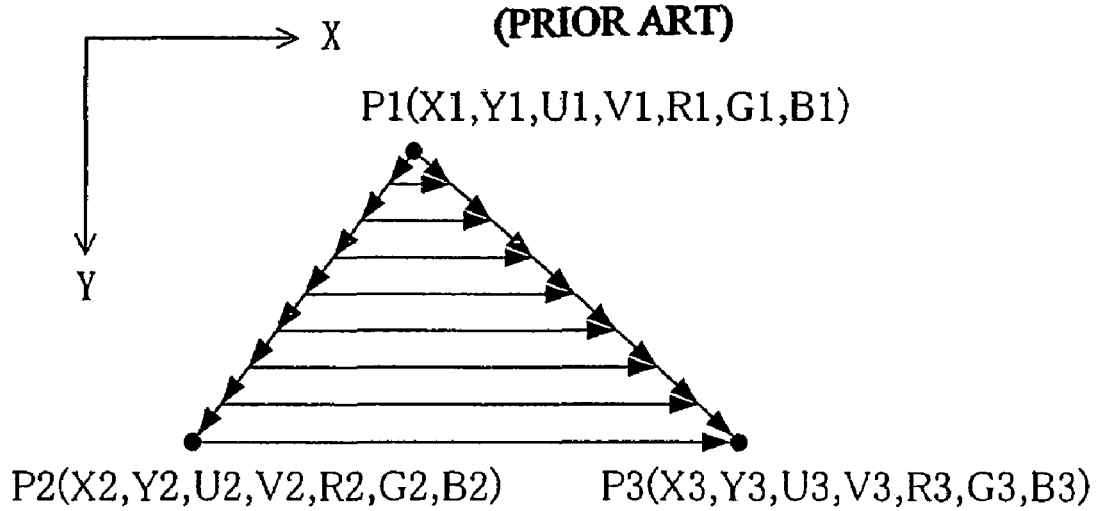
FIG. 18 illustrates the principle of the pixel information generation process of a triangle.
Figure 19:
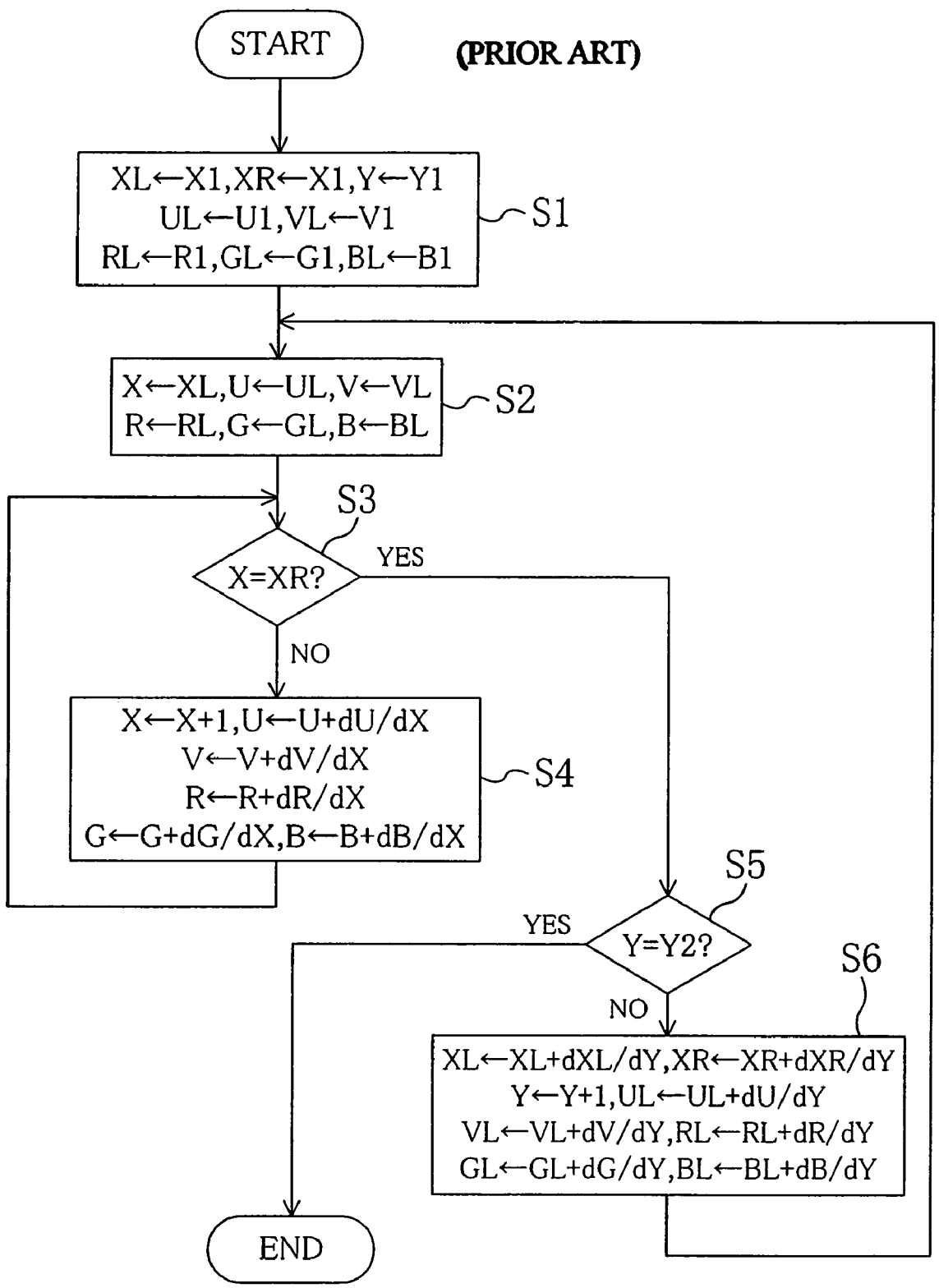
FIG. 19 is a flowchart of the pixel information generation process for a triangle.

In FIG. 1, the texture memory 2 and the frame memory 5 are similar to the ones described in the background art section (see FIG. 16).

A pixel information generation portion 7, like the pixel information generation portion 1 explained in the background art section, generates U, V, as well as R, G and B for the X and Y coordinates of each pixel constituting the graphic image, based on the X and Y coordinates, the texture coordinates U and V, as well as the R, G and B indicating the brightness given to the vertices of the graphic image that is to be rendered. Moreover, the pixel information generation portion 7 outputs an α, which is used for the degree of transparency, brightness adjustment or the like. α lies within the range of 0.0 and 1.0. Also for α, values corresponding to the X and Y coordinates of each pixel constituting the graphic image are determined by the same method as for U, V, R, G and B.

A pixel calculation portion 8 uses as input for its calculation the following values: R, G, B and α for each pixel put out from the pixel information generation portion 7, the R, G and B of the texture data, a constant RGB I and a constant RGB II. The pixel calculation portion 8 determines the combination of input values for its calculation units based on a calculation mode signal 9 that is input from the outside, and outputs the calculation result as the pixel data.

The following is a more detailed explanation of the internal configuration of the pixel calculation portion 8. Based on the calculation mode signal 9, calculation input selection portions 10 to 13 select the input values for the calculation units from the R, G, B and α and the texture data for each pixel. The values selected by the calculation input selection portions 10 and 11 are multiplied by a multiplier 14, and the values selected by the calculation input selection portions 12 and 13 are multiplied by a multiplier 15.

The calculation mode signal 9 includes a three-bit A input selection signal with which the calculation input selection portion 10 selects an input value for a calculation unit, a one-bit A input conversion signal that, assuming that the value selected by the A input selection signal is A, determines whether the input value for the calculation unit stays A or whether the input value for the calculation unit is set to (1-A), a three-bit B input selection signal with which the calculation input selection portion 11 selects an input value for a calculation unit, a three-bit C input selection signal with which the calculation input selection portion 12 selects an input value for a calculation unit, and a three-bit D input selection signal with which the calculation input selection portion 13 selects an input value for a calculation unit, FIG. 2 shows the association with which the calculation input selection portions select the input values for the calculation units, depending on the A to D input signal selection signals. It should be noted that the value A selected by the A input selection signal is input as it is into the calculation unit if the A input selection signal is 0, whereas it is set to (1-A) and input into the calculation unit if the A input selection signal is 1.

The multiplier 14 multiplies the R, G and B output from the calculation input selection portion 10 respectively with the R, G and B output from the calculation input selection portion 11. It should be noted that if the values output from the calculation input selection portions 10 or 11 are the α for each pixel, the constant 0 or the constant 1, then those are used respectively for the multiplication of R, G and B.

The multiplier 15 multiplies the R, G and B output from the calculation input selection portion 12 respectively with the R, G and B output from the calculation input selection portion 13. It should be noted that, as with the multiplier 14, if the values output from the calculation input selection portions 12 or 13 are the α for each pixel, the constant 0 or the constant 1, then those are used respectively for the multiplication of R, G and B.

The adder 16 adds the R, G and B output from the multiplier 14 respectively to the R, G and B output from the multiplier 15, and outputs pixel data. If R, G or B after the addition exceed 1.0, then that value is saturated to 1.0.

A memory interface portion 17 writes into the frame memory 5 the pixel data at the locations corresponding to the X and Y coordinates that are output by the pixel information generation portion 7.

With the configuration of this embodiment, the details of the calculation and the input variables can be changed freely using the same calculation circuit, so that dedicated calculation circuits for each rendering function are unnecessary, and multi-functional rendering becomes possible with a circuit of a small scale.

Embodiment 2

Figure 3:
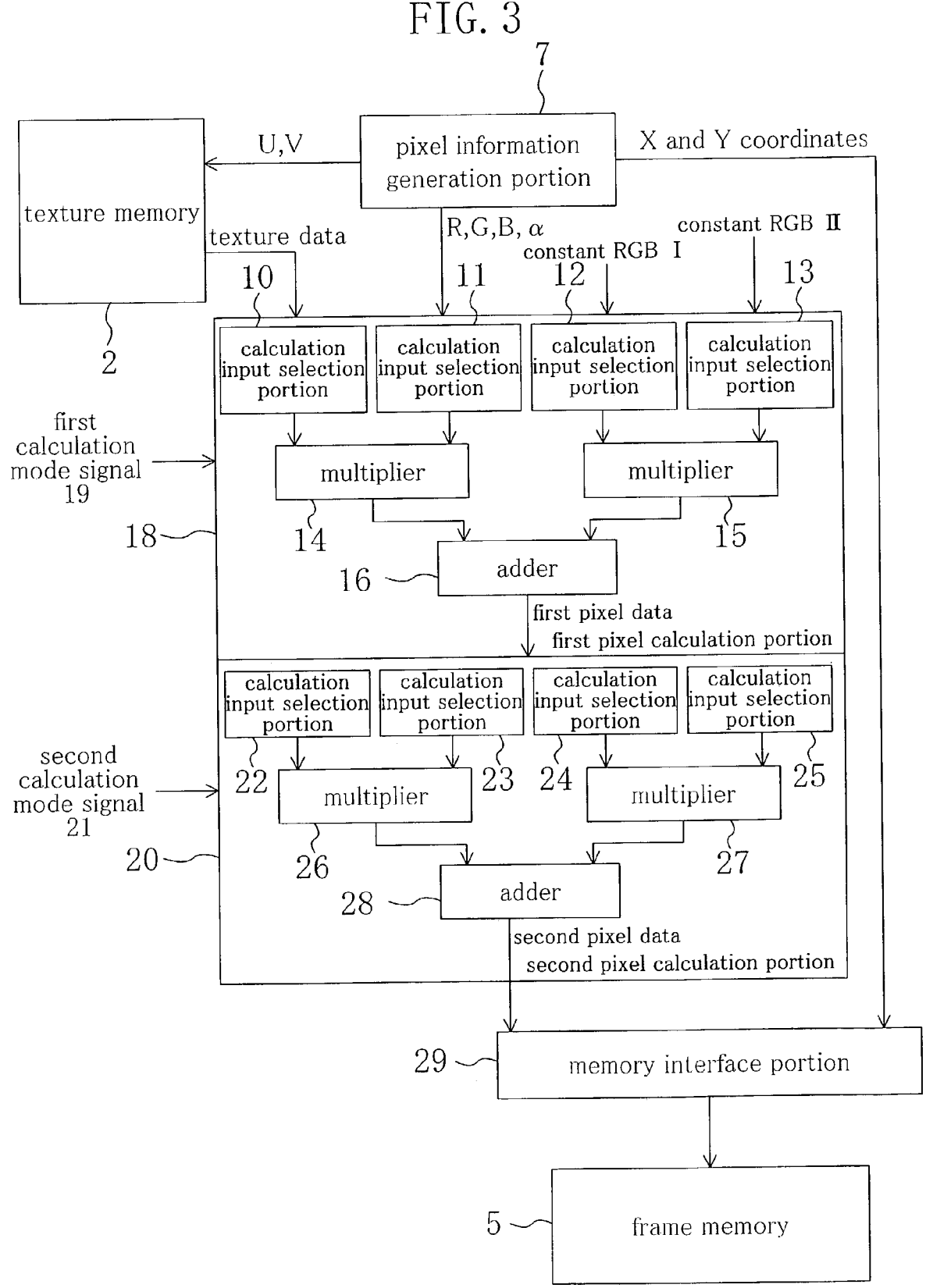
FIG. 3 is a block diagram showing the configuration of a graphic image rendering apparatus in accordance with Embodiment 2 of the present invention.

The following is a detailed explanation of Embodiment 2 of the present invention. FIG. 3 is a block diagram showing the configuration of a graphic image rendering apparatus in accordance with Embodiment 2.

In FIG. 3, the texture memory 2, the frame memory 5 and the pixel information generation portion 7 are similar to the ones described in Embodiment 1 (see FIG. 1).

A first pixel calculation portion 18, which has the same configuration as the pixel calculation portion 8 explained in Embodiment 1, determines a combination of input values for its calculation units based on a first calculation mode signal 19 that is input from the outside, and outputs a calculation result as first pixel data. Also the first calculation mode signal 19 is the same as the calculation mode signal 9 explained in Embodiment 1.

A second pixel calculation portion 20 uses as input for its calculation the following values: the R, G, B and α for each pixel, the R, G and B of the texture data, a constant RGB I, a constant RGB II, and furthermore the first pixel data, which are the calculation result of the first pixel calculation portion 18. The second pixel calculation portion 20 determines the combination of input values given into its calculation units based on a second calculation mode signal 21 that is input from the outside, and outputs the calculation result as second pixel data.

The following is a more detailed explanation of the internal configuration of the second pixel calculation portion 20. Based on the second calculation mode signal 21, calculation input selection portions 22 to 25 select the input values for the calculation units from the R, G, B and α for each pixel, the texture data and the first pixel data. The values selected by the calculation input selection portions 22 and 23 are multiplied by a multiplier 26, and the values selected by the calculation input selection portions 24 and 25 are multiplied by a multiplier 27.

The second calculation mode signal 21 includes a three-bit E input selection signal with which the calculation input selection portion 22 selects an input value for a calculation unit, a one-bit E input conversion signal that, assuming that the value selected by the E input selection signal is E, determines whether the input value for the calculation unit stays E or whether the input value for the calculation unit is set to (1-E), a three-bit F input selection signal with which the calculation input selection portion 23 selects an input value for a calculation unit, a three-bit G input selection signal with which the calculation input selection portion 24 selects an input value for a calculation unit, and a three-bit H input selection signal with which the calculation input selection portion 25 selects an input value for a calculation unit, FIG. 4 shows the association with which the calculation input selection portions select the input values for the calculation units, depending on the E to H input signal selection signals. It should be noted that the value E selected by the E input selection signal is input as it is into the calculation unit if the E input selection signal is 0, whereas it is set to (1-E) and input into the calculation unit if the E input selection signal is 1.

The multiplier 26 multiplies the R, G and B output from the calculation input selection portion 22 respectively with the R, G and B output from the calculation input selection portion 23. It should be noted that if the values output from the calculation input selection portions 22 or 23 are the α for each pixel, the constant 0 or the constant 1, then those are used respectively for the multiplication of R, G and B.

The multiplier 27 multiplies the R, G and B output from the calculation input selection portion 24 respectively with the R, G and B output from the calculation input selection portion 25. It should be noted that, as with the multiplier 26, if the values output from the calculation input selection portions 24 or 25 are the α for each pixel, the constant 0 or the constant 1, then those are used respectively for the multiplication of R, G and B.

The adder 28 adds the R, G and B output from the multiplier 26 respectively to the R, G and B output from the multiplier 27, and outputs second pixel data. If R, G or B after the addition exceed 1.0, then that value is saturated to 1.0.

A memory interface portion 29 writes into the frame memory 5 the second pixel data at the locations corresponding to the X and Y coordinates that are output by the pixel information generation portion 7.

With the configuration of this embodiment, the calculation circuit of Embodiment 1 is provided as two stages, and the calculation result of the first stage can be reflected in the calculation of the second stage, so that the combinations of calculations are increased and rendering with even more functions becomes possible.

If the configuration includes three or more calculation circuits, then the calculation result of the prior stages can be reflected in the calculation of the latter stages, and the calculation result of the last stage may be written into the frame memory.

Embodiment 3

Figure 5:
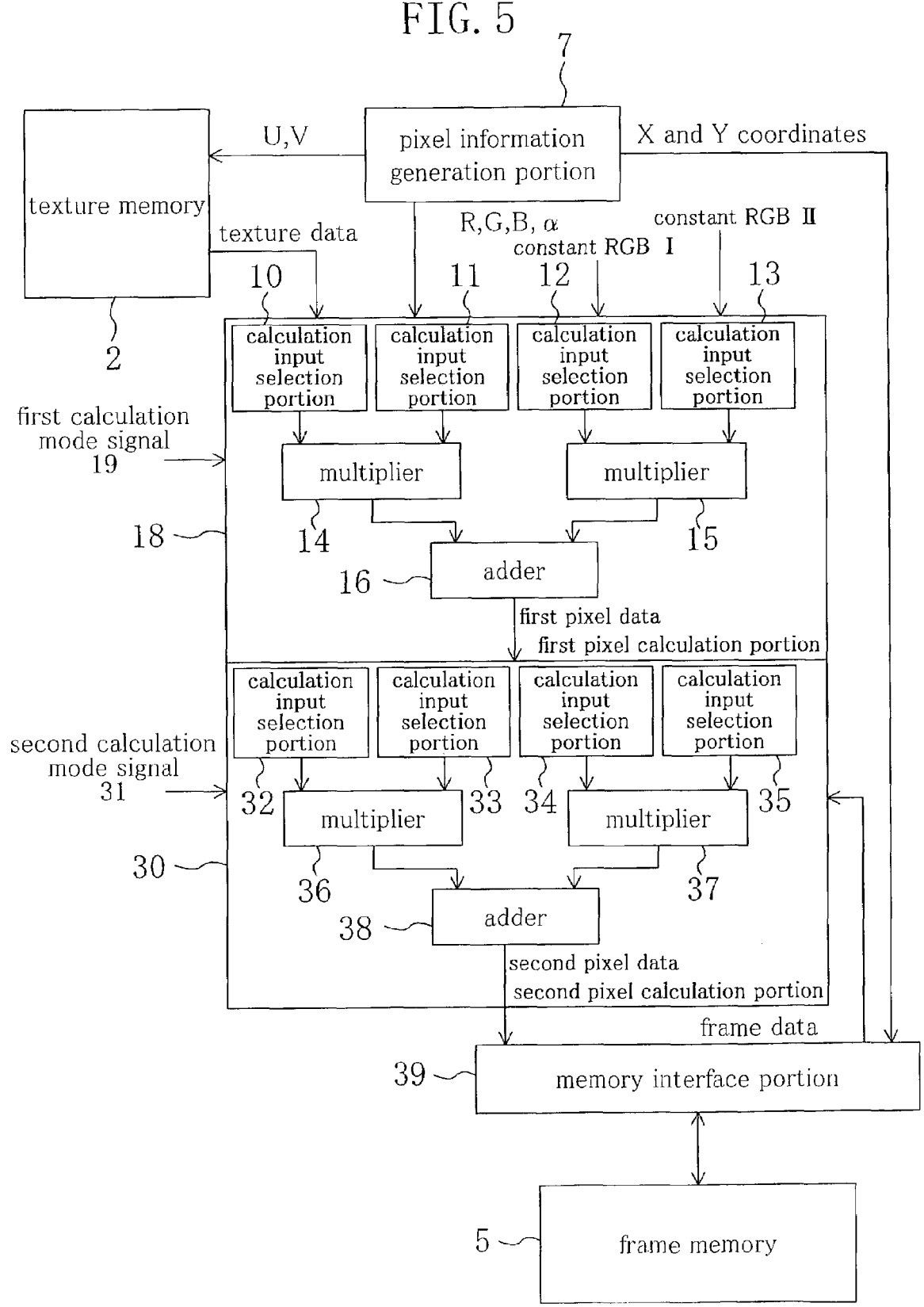
FIG. 5 is a block diagram showing the configuration of a graphic image rendering apparatus in accordance with Embodiment 3 of the present invention.

The following is a detailed explanation of Embodiment 3 of the present invention. FIG. 5 is a block diagram showing the configuration of a graphic image rendering apparatus in accordance with Embodiment 3.

In FIG. 5, the texture memory 2, the frame memory 5, the pixel information generation portion 7, the first pixel calculation portion 18, and the first calculation mode signal 19 are similar to the ones described in Embodiment 2 (see FIG. 3).

A second pixel calculation portion 30 uses as input for its calculation the following values: the R, G, B and α for each pixel, the R, G and B of the texture data, the constant RGB I, the constant RGB II, the first pixel data, which are the calculation result of the first pixel calculation portion 18, and furthermore the frame data, which are the pixel data previously stored in locations corresponding to the X and Y coordinates in the frame memory 5. The second pixel calculation portion 30 determines the combination of input values for its calculation units based on a second calculation mode signal 31 that is input from the outside, and outputs the calculation result as second pixel data.

The following is a more detailed explanation of the internal configuration of the second pixel calculation portion 30. Based on the second calculation mode signal 31, calculation input selection portions 32 to 35 select the input values for the calculation units from the R, G, B and α for each pixel, the texture data, the first pixel data and the frame data.

The values selected by the calculation input selection portions 32 and 33 are multiplied by a multiplier 36, and the values selected by the calculation input selection portions 34 and 35 are multiplied by a multiplier 37.

The second calculation mode signal 31 includes a four-bit E input selection signal with which the calculation input selection portion 32 selects an input value for a calculation unit, a one-bit E input conversion signal that, assuming that the value selected by the E input selection signal is E, determines whether the input value for the calculation unit stays E or whether the input value for the calculation unit is set to (1-E), a four-bit F input selection signal with which the calculation input selection portion 33 selects an input value for a calculation unit, a four-bit G input selection signal with which the calculation input selection portion 34 selects an input value for a calculation unit, and a four-bit H input selection signal with which the calculation input selection portion 35 selects an input value for a calculation unit.

FIG. 6 shows the association with which the calculation input selection portions select the input values for the calculation units, depending on the E to H input signal selection signals. It should be noted that the value E selected by the E input selection signal is input as it is into the calculation unit if the E input selection signal is 0, whereas it is set to (1-E) and input into the calculation unit if the E input selection signal is 1.

The multiplier 36 multiplies the R, G and B output from the calculation input selection portion 32 respectively with the R, G and B output from the calculation input selection portion 33. It should be noted that if the values output from the calculation input selection portions 32 or 33 are the α for each pixel, the constant 0 or the constant 1, then those are used respectively for the multiplication of R, G and B.

The multiplier 37 multiplies the R, G and B output from the calculation input selection portion 34 respectively with the R, G and B output from the calculation input selection portion 35. It should be noted that, as with the multiplier 36, if the values output from the calculation input selection portions 34 or 35 are the α for each pixel, the constant 0 or the constant 1, then those are used respectively for the multiplication of R, G and B.

The adder 38 adds the R, G and B output from the multiplier 36 respectively to the R, G and B output from the multiplier 37, and outputs second pixel data. If R, G or B after the addition exceed 1.0, then that value is saturated to 1.0.

A memory interface portion 39 reads from the frame memory 5 the frame data, which are the pixel data previously stored at the locations corresponding to the X and Y coordinates that are output by the pixel information generation portion 7. Furthermore, the memory interface portion 39 writes into the frame memory 5 the second pixel data at the locations corresponding to the X and Y coordinates that are output by the pixel information generation portion 7.

It should be noted that if the second calculation mode signal 31 is set so as not to use frame data, then the memory interface portion 39 does not carry out a process of reading out frame data from the frame memory 5. Conversely, if the second calculation mode signal 31 is set so as to use frame data, then the memory interface portion 39 carries out a process of reading out frame data from the frame memory 5 before writing the second pixel data into the frame memory 5.

With the configuration of this embodiment, the second stage of a two-stage calculation circuit is provided with a path for readout from the frame memory, and the frame data can be reflected in the calculation, so that rendering with even more functions, such as alpha blending, becomes possible.

If the configuration includes three or more calculation circuits, then the calculation result of the prior stages can be reflected in the calculation of the latter stages, the frame data can be reflected in the calculation of the last stage, and the calculation result of the last stage may be written into the frame memory.

Furthermore, if the number of calculation stages in the above-described Embodiment 2 is increased, then calculation circuits corresponding to the number of stages become necessary and the scale of the circuit increases. However, with the configuration of Embodiment 3, if a rendering with more calculation stages than there are stages in the calculation circuits is to be carried out, then it is possible to first build up in the frame memory a result calculated with the existing calculation circuit stages, and then reflect the frame data at the same rendering position in the calculation circuit of the latest stage, thereby adding calculations to the calculation result of the previous stages. Such additional calculations may be performed until the necessary number of calculation stages is reached.

Thus, it is possible to increase the number of calculation stages without increasing the calculation circuitry, so that multi-functional rendering with a small circuit scale is possible.

Embodiment 4

Figure 7:
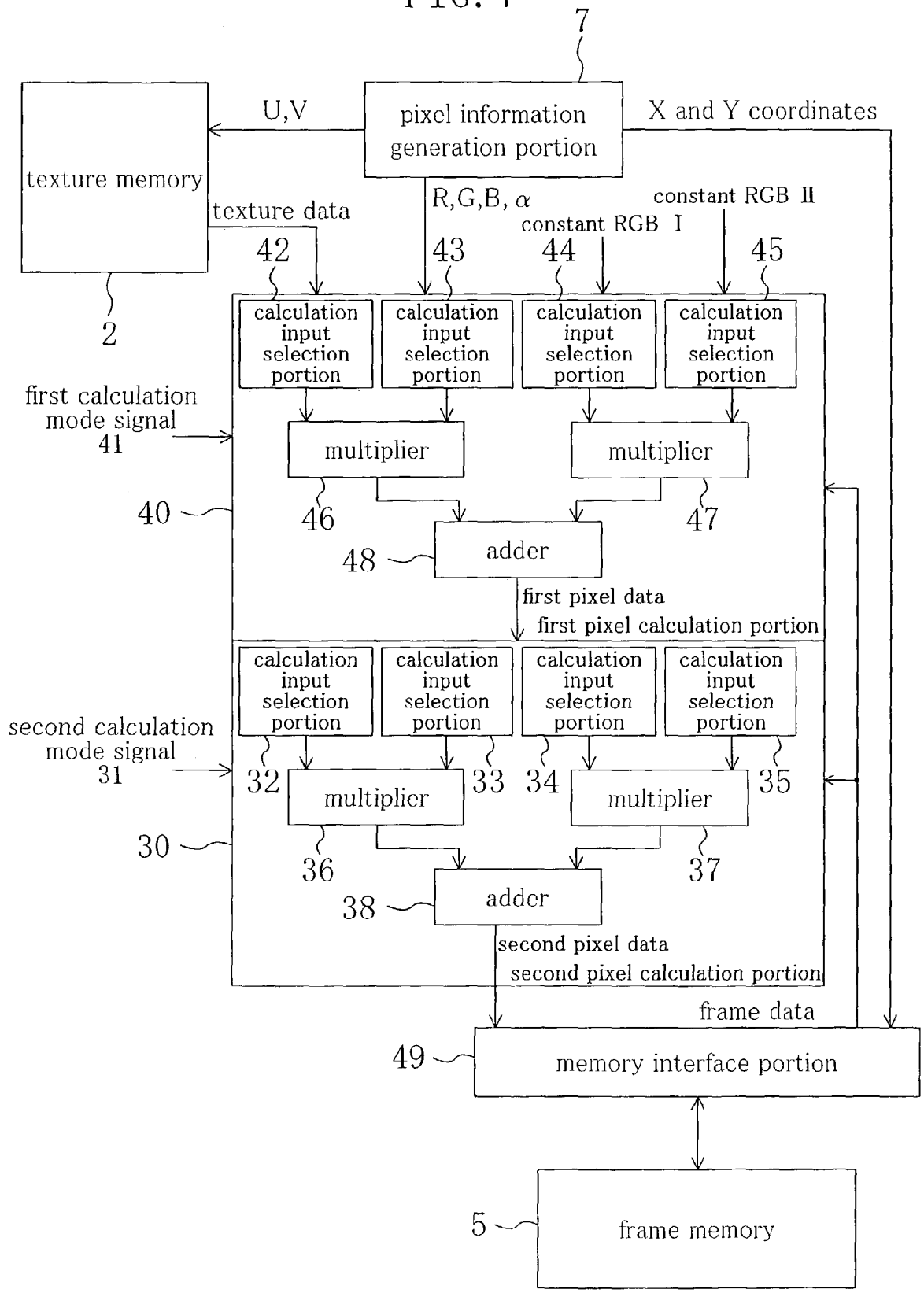
FIG. 7 is a block diagram showing the configuration of a graphic image rendering apparatus in accordance with Embodiment 4 of the present invention.

The following is a detailed explanation of Embodiment 4 of the present invention. FIG. 7 is a block diagram showing the configuration of a graphic image rendering apparatus in accordance with Embodiment 4.

In FIG. 7, the texture memory 2, the frame memory 5, the pixel information generation portion 7, the second pixel calculation portion 30 and the second calculation mode signal 31 are similar to the ones described in Embodiment 3 (see FIG. 5).

A first pixel calculation portion 40 uses as input for its calculation the following values: R, G, B and α for each pixel, the R, G and B of the texture data, a constant RGB I, a constant RGB II, and furthermore the frame data. The first pixel calculation portion 40 determines the combination of input values given into its calculation units based on a first calculation mode signal 41 that is input from the outside, and outputs the calculation result as first pixel data.

The following is a more detailed explanation of the internal configuration of the first pixel calculation portion 40. Based on the first calculation mode signal 41, calculation input selection portions 42 to 45 select the input values for the calculation units from the R, G, B and α for each pixel, the texture data, and the frame data.

The values selected by the calculation input selection portions 42 and 43 are multiplied by a multiplier 46, and the values selected by the calculation input selection portions 44 and 45 are multiplied by a multiplier 47.

The first calculation mode signal 41 includes a three-bit A input selection signal with which the calculation input selection portion 42 selects an input value for a calculation unit, a one-bit A input conversion signal that, assuming that the value selected by the A input selection signal is A, determines whether the input value for the calculation unit stays A or whether the input value for the calculation unit is set to (1-A), a three-bit B input selection signal with which the calculation input selection portion 43 selects an input value for a calculation unit, a three-bit C input selection signal with which the calculation input selection portion 44 selects an input value for a calculation unit, and a three-bit D input selection signal with which the calculation input selection portion 45 selects an input value for a calculation unit, FIG. 8 shows the association with which the calculation input selection portions select the input values for the calculation units, depending on the A to D input signal selection signals. It should be noted that the value A selected by the A input selection signal is input as it is into the calculation unit if the A input selection signal is 0, whereas it is set to (1-A) and input into the calculation unit if the A input selection signal is 1.

The multiplier 46 multiplies the R, G and B output from the calculation input selection portion 42 respectively with the R, G and B output from the calculation input selection portion 43. It should be noted that if the values output from the calculation input selection portions 42 or 43 are the α for each pixel, the constant 0 or the constant 1, then those are used respectively for the multiplication of R, G and B.

The multiplier 47 multiplies the R, G and B output from the calculation input selection portion 44 respectively with the R, G and B output from the calculation input selection portion 45. It should be noted that, as with the multiplier 46, if the values output from the calculation input selection portions 44 or 45 are the α for each pixel, the constant 0 or the constant 1, then those are used respectively for the multiplication of R, G and B.

The adder 48 adds the R, G and B output from the multiplier 46 respectively to the R, G and B output from the multiplier 47, and outputs first pixel data. If R, G or B after the addition exceed 1.0, then that value is saturated to 1.0.

A memory interface portion 49 reads from the frame memory 5 the frame data, which are the pixel data previously stored at the locations corresponding to the X and Y coordinates that are output by the pixel information generation portion 7. Furthermore, the memory interface portion 49 writes into the frame memory 5 the second pixel data at the locations corresponding to the X and Y coordinates that are output by the pixel information generation portion 7.

It should be noted that if the first calculation mode signal 41 or the second calculation mode signal 31 are set so as not to use frame data, then the memory interface portion 49 does not carry out a process of reading out frame data from the frame memory 5. Conversely, if the first calculation mode signal 41 or the second calculation mode signal 31 are set so as to use frame data, then the memory interface portion 49 carries out a process of reading out frame data from the frame memory 5 before writing the second pixel data into the frame memory 5.

With the configuration of this embodiment, the two stages of a two-stage calculation circuit are respectively provided with a path for readout from the frame memory, and the frame data can be reflected in the calculation. Thus, if the frame data are reflected in the calculation circuit of the first stage when performing an addition calculation for three or more stages, the calculation of the second stage can be performed without reading frame data from the frame memory, thereby reducing the access time to the frame memory and speeding up the processing.

If the configuration includes three or more calculation circuits, then the calculation result of the prior stages can be reflected in the calculation of the latter stages, the frame data can be reflected in the respective calculations, and the calculation result of the last stage may be written into the frame memory.

Figure 9:
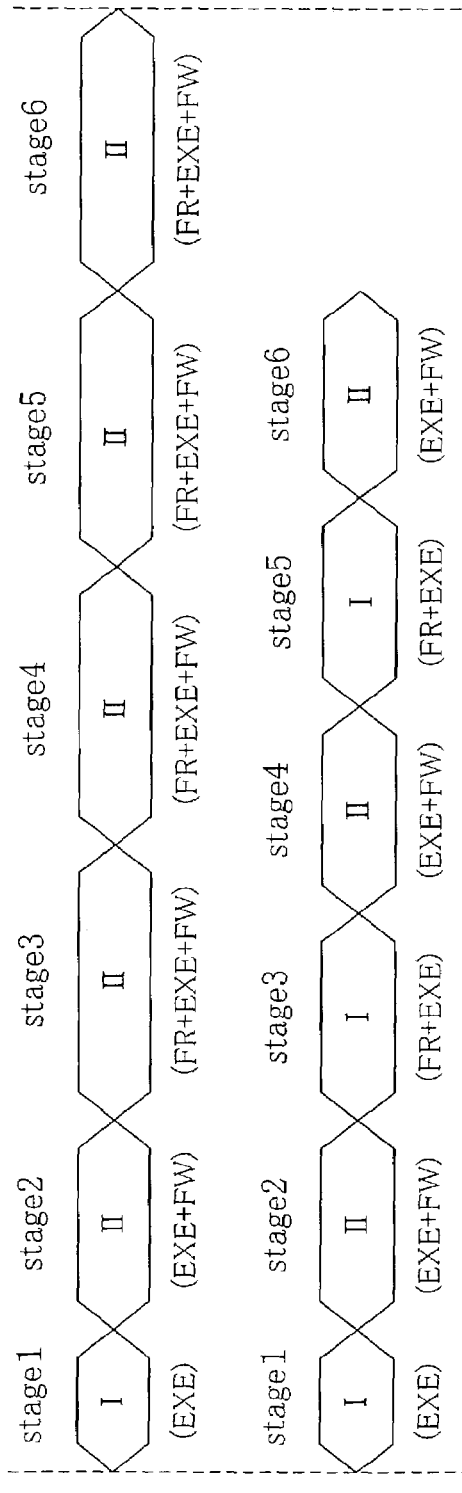
FIG. 9 is a diagram illustrating an estimate of the processing time for the case that a six-stage calculation is performed with the configurations of Embodiment 3 and Embodiment 4 of the present invention, each provided with two stages of calculation circuits.

In the following, the effect of speeding up the process achieved by the configuration of Embodiment 4 is explained with reference to FIG. 9. FIG. 9 is a diagram illustrating an estimate of the processing time for the case that a six-stage calculation is performed with the configurations of Embodiment 3 and Embodiment 4, each provided with two stages of calculation circuits. FIG. 9A illustrates Embodiment 3 and FIG. 9B illustrates Embodiment 4.

In FIG. 9, the period I indicates the processing time relating to the calculation circuit of the first stage and II indicates the processing time relating to the calculation circuit of the second stage. "EXE" means that a calculation is executed, "FW" means that pixel data are written into the frame memory, and "FR" means that frame data are read from the frame memory.

When the time for writing into the frame memory is substantially the same as the time for reading from the frame memory, then a rough estimate of the processing time combining EXE, FW and FR is as follows:

$$(EXE)<(FR+EXE)\approx(EXE+FW)<(FR+EXE+FW)$$

In the configuration of Embodiment 3, only the calculation circuit of the second stage can reflect the frame data in its calculation, so that for the calculation of the third and all further stages, the frame data each time has to be read from the frame memory, and the calculation result written into the frame memory. When performing a calculation of six stages, there are five stages with a process of writing into the frame memory and four stages with a process of reading from the frame memory, as shown in FIG. 9A.

In the configuration of Embodiment 4, the circuitry for frame data selection is increased, but the frame data can be reflected in the respective calculation circuits, so that in the calculation of the third and all further stages, the frame data read from the frame memory are reflected in the calculation of the first stage, and the calculation result attained by reflecting the calculation result of the first stage in the calculation circuit of the second stage is written into the frame memory, so that the time for writing into and reading out of the frame memory can be reduced. When performing a calculation of six stages, there are three stages with a process of writing into the frame memory and two stages with a process of reading from the frame memory, as shown in FIG. 9B, so that it can be seen that the process can be sped up.

Embodiment 5

The following is a detailed explanation of Embodiment 5 of the present invention. As has been explained in the configurations of the embodiments described so far, the more stages of calculation circuits there are, the more functions are available for rendering and the smaller is the frequency with which the frame memory is accessed when performing calculations of multiple stages, so that rendering can be sped up. On the other side, in configurations with many stages of calculation circuits, the settings for the calculation mode signal deciding the input into the calculation units increase, thus complicating the control.

Figure 10:
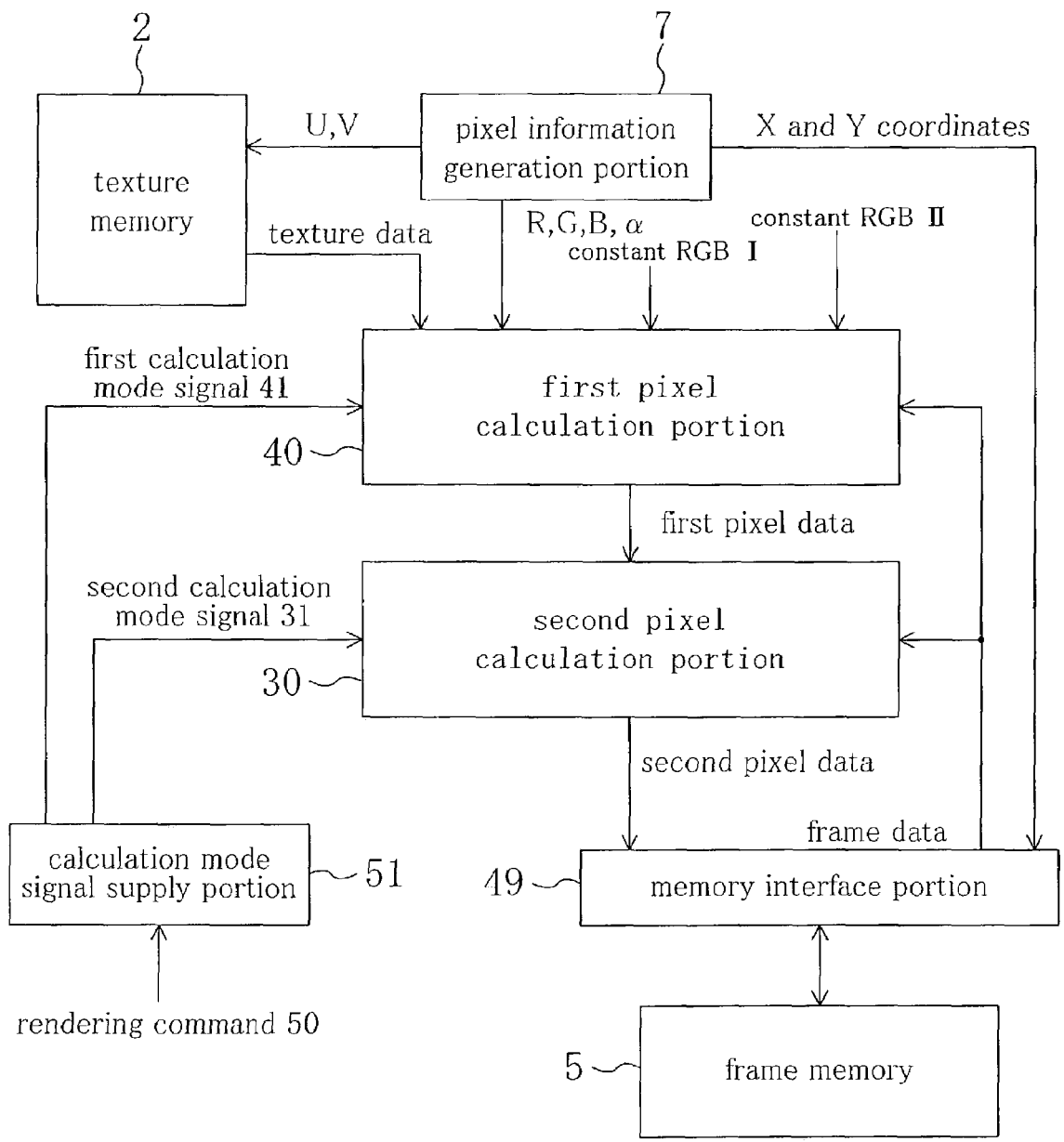
FIG. 10 is a block diagram showing the configuration of a graphic image rendering apparatus in accordance with Embodiment 5 of the present invention.

The graphic image rendering apparatus in accordance with Embodiment 5 of the present invention, which solves this problem, has the configuration shown in the block diagram of FIG. 10.

The graphic image rendering apparatus in FIG. 10 is similar to the one explained in Embodiment 4 (see FIG. 7), except for a rendering command 50 and a calculation mode signal supply portion 51.

The rendering command 50 is supplied from the outside with parameters in which the rendering function is encoded, in order to classify the rendering calculations.

Based on the rendering command 50, the calculation mode signal supply portion 51 generates the first calculation mode signal 41 and the second calculation mode signal 31, and supplies them to the first pixel calculation portion 40 and the second pixel calculation portion 30. FIG. 11 shows the assignment of the rendering command 50 for each rendering function to the first calculation mode signal 41 and the second calculation mode signal 31 generated by the calculation mode signal supply portion 51. Needless to say, it is also possible to assign rendering functions that are not shown in the drawings.

In FIG. 11, to give an example of alpha blending, the calculation of the first pixel calculation portion 40 becomes:

(texture)×(R, G, B for each pixel)+(constant RGB I)×X1→first pixel data and the calculation of the second pixel calculation portion 30 becomes:

(1−α for each pixel)×(first pixel data)+(α for each pixel)×(frame data)→second pixel data If a calculation with more stages than there are calculation circuits is performed, then the calculation mode signal supply portion 51 stores the calculation mode signal necessary for each calculation and assigns calculation mode signals in correspondence with the calculation performed by each calculation circuit.

With this configuration, if a calculation with many stages is performed, then it is not necessary to set rendering mode signals for many stages and it is sufficient to set a rendering command with little information content, so that control is simple and the time for preparations and settings of the rendering parameters performed on the outside can be shortened.

Embodiment 6

The following is a more detailed explanation of Embodiment 6 of the present invention. In order to store the graphic image information displayed on the display, the frame memory necessitates a memory of large capacity, and is often employed as an external LSI system. Generally speaking, external memories are slower with regard to reading and writing than internal memories.

In the configuration of the embodiments described thus far, the more stages of calculations are performed, the larger the number of accesses to the frame memory becomes, and the larger the influence that slow access to the frame memory has on the rendering performance.

Figure 12:
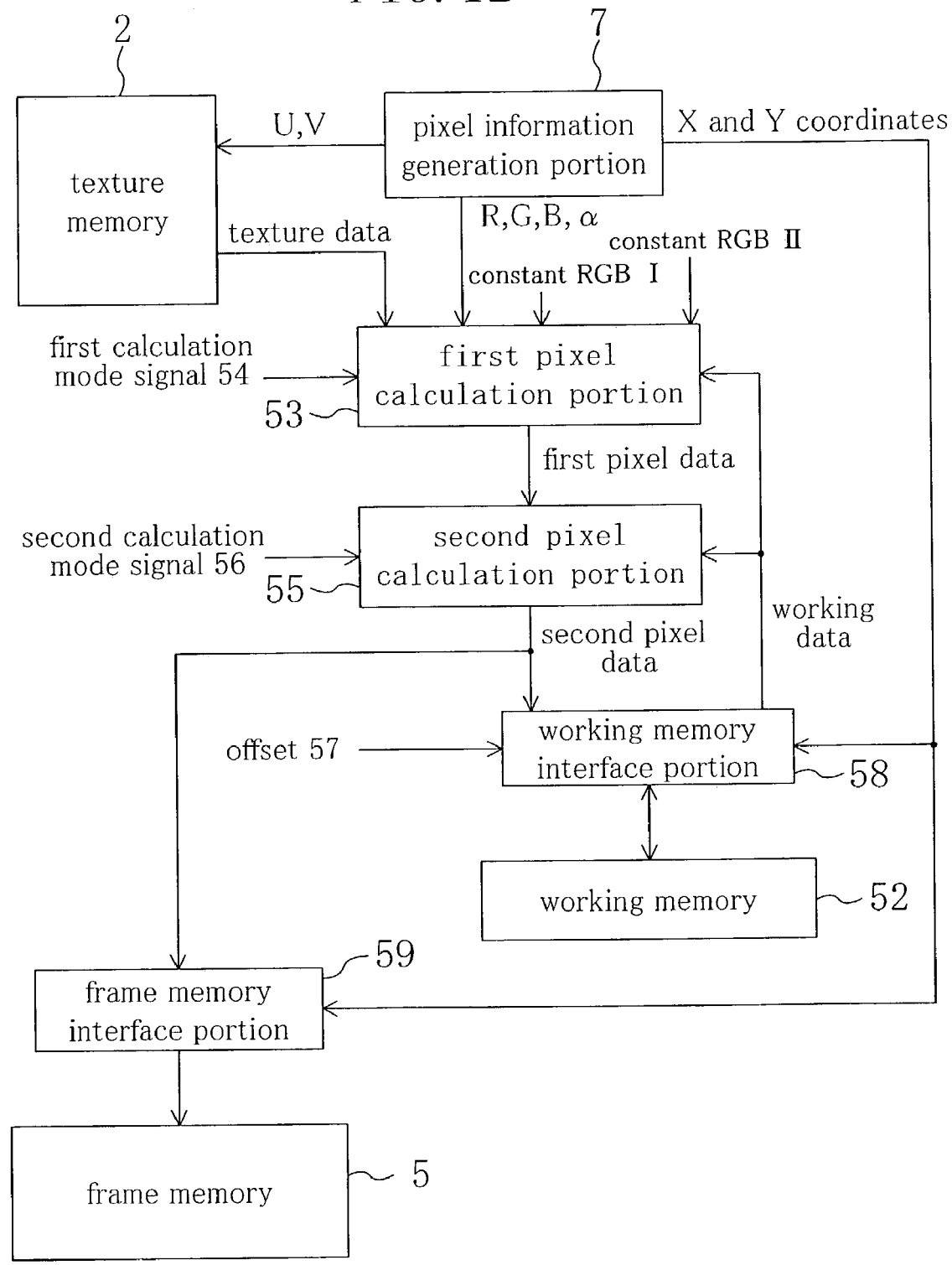
FIG. 12 is a block diagram showing the configuration of a graphic image rendering apparatus in accordance with Embodiment 6 of the present invention.

The graphic image rendering apparatus in Embodiment 6 of the present invention, which solves this problem, has the configuration shown in the block diagram of FIG. 12.

In FIG. 12, the texture memory 2, the frame memory 5, and the pixel information generation portion 7 are similar to the ones described in Embodiment 4 (see FIG. 7).

A working memory 52 is a memory for storing the pixel data of intermediate calculation results if more stages of calculations are carried out than there are stages of calculation circuits, and the smallest coordinate point of a rectangle circumscribing the rendered graphic image is taken as the origin of the coordinate system.

Whereas the frame memory 5 is an external memory of large capacity, it is sufficient that the working memory 52 stores the pixel data of the rectangular region circumscribing the largest graphic image, so that it may be an internal memory of small capacity.

The first pixel calculation portion 53 has a configuration in which the frame data of the first pixel calculation portion 40 explained in Embodiment 4 have been replaced by the working data, which are the pixel data that have previously been stored in the working memory 52. Based on the first calculation mode signal 54 that is output from the outside, the first pixel calculation portion 53 determines the combination of input values for its calculation units, and outputs the calculation result as first pixel data.

The configuration of the first calculation mode signal 54 is such that the frame data of the first calculation mode signal 41 explained in Embodiment 4 have been replaced by the working data.

The second pixel calculation portion 55 has a configuration in which the frame data of the second pixel calculation portion 30 explained in Embodiment 4 have been replaced by the working data. Based on the second calculation mode signal 56 that is output from the outside, the second pixel calculation portion 55 determines the combination of input values for its calculation units, and outputs the calculation result as second pixel data.

The configuration of the second calculation mode signal 56 is such that the frame data of the second calculation mode signal 31 explained in Embodiment 4 have been replaced by the working data.

It should be noted that the first calculation mode signal 54 and the second calculation mode signal 56 may be input from the outside, or they may be given by a calculation mode signal supply portion 51 based on a rendering command 50, as explained in Embodiment 5.

An offset 57 is the smallest X and Y coordinate values of the rectangle circumscribing the graphic image to be rendered, and is the amount of parallel shift from the origin.

A working memory interface portion 58 reads from the working memory 52 the working data corresponding to the X and Y coordinates obtained by subtracting the X and Y values of the offset 57 respectively from the X and Y coordinates that are output by the pixel information generation portion 7.

The working memory interface portion 58 also writes into the working memory 52 the second pixel data into locations corresponding to the X and Y coordinates obtained by subtracting the X and Y values of the offset 57 from the X and Y coordinates that are output by the pixel information generation portion 7.

Here, the reason why the X and Y coordinates obtained by subtracting the X and Y values of the offset 57 from the X and Y coordinates that are output by the pixel information generation portion 7 are used is so as to convert the X and Y coordinates that are output from the pixel information generation portion 7 from the coordinates in the frame memory 5 into the coordinates in the working memory 52.

If the first calculation mode signal 54 or the second calculation mode signal 56 are set such that the working data are not used, then the working memory interface portion 58 does not perform a process of reading out the working data from the working memory 52. On the other hand, if the first calculation mode signal 54 or the second calculation mode signal 56 are set such that the working data are used, then the working memory interface portion 58 performs a process of reading out the working data from the working memory 52 before writing the second pixel data into the working memory 52.

Only if the second pixel calculation portion 55 is performing the calculation of the last stage, then a frame memory interface portion 59 writes the second pixel data into the frame memory 5 at locations corresponding to the X and Y coordinates that are output from the pixel information generation portion 7.

If the frame data are needed before rendering the graphic image, then it is also possible to transfer the frame data of the rectangular region circumscribing the graphic image to be rendered from the frame memory 5 to the working memory 52.

With this configuration, when calculating multiple stages, intermediate calculation results are built up in the high-speed working memory 52, and only the calculation result of the last stage is written into the low-speed frame memory 5, thereby making it faster compared to a configuration in which the intermediate calculation results are built up in the frame memory 5.

In a configuration with three or more stages of calculation circuits, the calculation result of the previous stages may be reflected in the calculations of the latter stages, the working data may be reflected by the respective calculation circuits, and the calculation result of the last stage may be written into the working memory and the frame memory.

Figure 13:
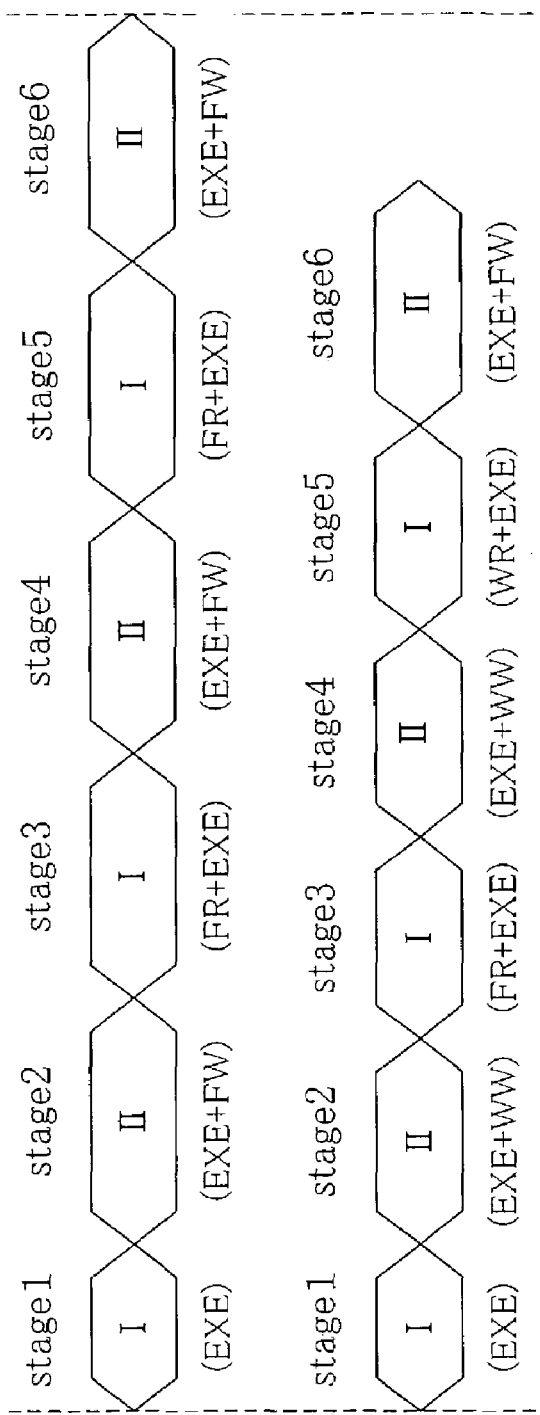
FIG. 13 is a diagram illustrating an estimate of the processing time for the case that a six-stage calculation is performed with the configurations of Embodiment 4 and Embodiment 6 of the present invention, each provided with two stages of calculation circuits.

In the following, the effect of speeding up the process achieved by the configuration of Embodiment 6 is explained with reference to FIG. 13. FIG. 13 is a diagram illustrating an estimate of the processing time for the case that a six-stage calculation is performed with the configurations of Embodiment 4 and Embodiment 6, each provided with two stages of calculation circuits. FIG. 13A illustrates the process of Embodiment 4 and FIG. 13B illustrates the process of Embodiment 6.

In FIG. 13, the period I indicates the processing time relating to the calculation circuit of the first stage and the period II indicates the processing time relating to the calculation circuit of the second stage. "EXE" means that a calculation is executed, "FW" means that pixel data are written into the frame memory, and "FR" means that frame data are read from the frame memory. "WW" means that pixel data are written into the working memory, and "WR" means that working data are read from the working memory.

When the time for writing into the frame memory is substantially the same as the time for reading from the frame memory, the time for writing into the working memory is substantially the same as the time for reading from the working memory, and the time for reading and writing to the frame memory is longer than the time for reading and writing to the working memory, then a rough estimate of the processing time combining EXE, FW, FR, WW and WR is as follows:

$$(EXE) < (WR + EXE) \approx (EXE + WW) < (FR + EXE) \approx (EXE + FW)$$

In the configuration of Embodiment 4, as mentioned above, the frame data read out from the frame memory is reflected by the first-stage calculation circuit in the calculation of the third and further stages, and the calculation result obtained by reflecting the calculation result of the first stage in the calculation circuit of the second stage is written into the frame memory. When performing a calculation of six stages, there are three stages with a, process of writing into the frame memory and two stages with a process of reading from the frame memory, as shown in FIG. 13A.

With the configuration of Embodiment 6, intermediate calculation results are built up in the high-speed working memory, and only the calculation result of the last stage is written into the low-speed frame memory, the working data read out from the working memory into the calculation circuit is reflected at the third and further calculations, and the calculation result obtained by reflecting the calculation result of the first stage in the calculation circuit of the second stage is written into the working memory. Then, only the calculation result of the sixth stage, which is the last stage, is written into the frame memory. When performing a calculation of six stages, there are two stages with a process of writing into the working memory, two stages with a process of reading from the working memory, and one stage with a process of writing into the frame memory, as shown in FIG. 13B. The time for reading or writing with respect to the working memory is shorter than the time for reading or writing with respect to the frame memory, and it can be seen that the processing can be sped up.

Embodiment 7

Figure 14:
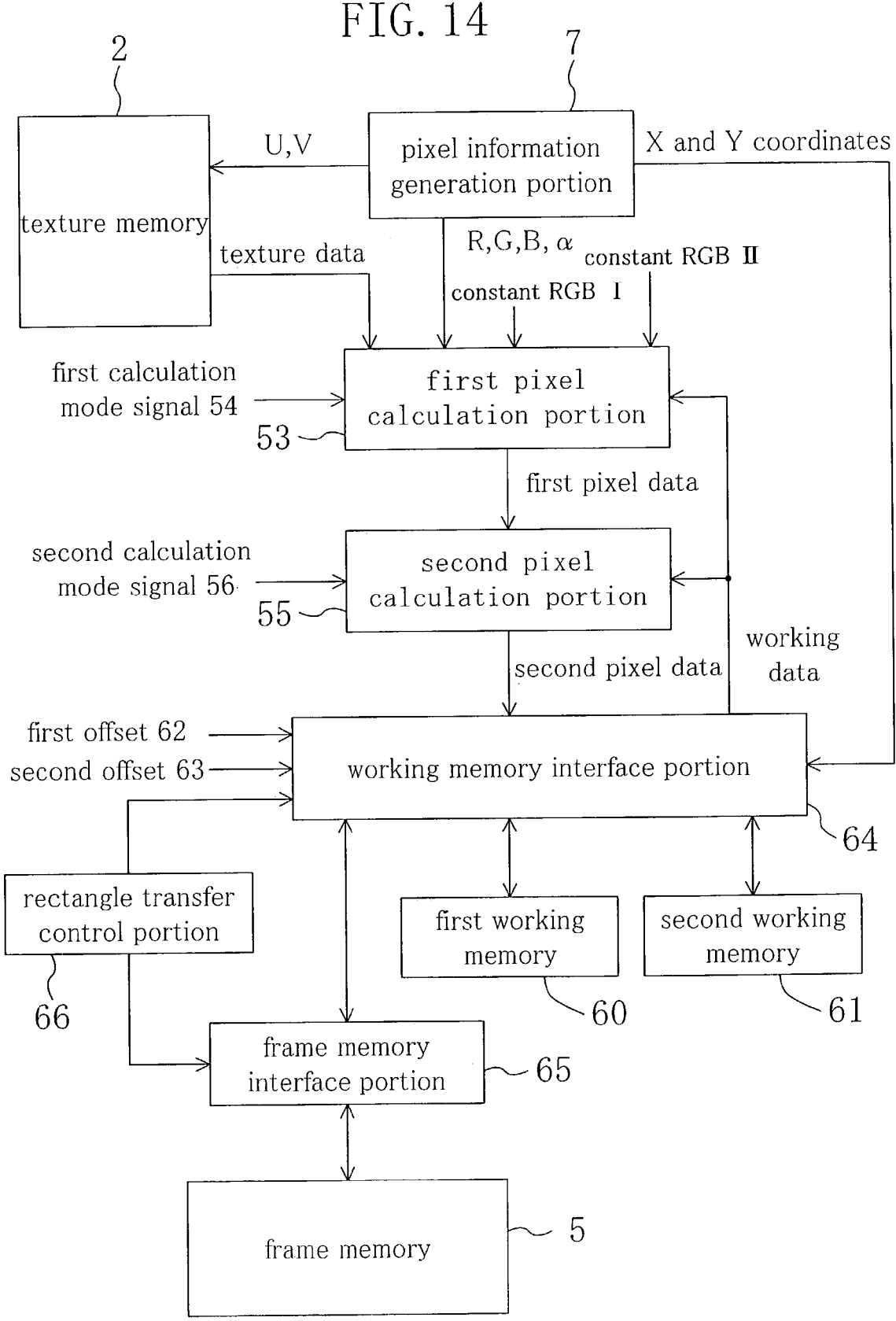
FIG. 14 is a block diagram showing the configuration of a graphic image rendering apparatus in accordance with Embodiment 7 of the present invention.

The following is a detailed explanation of Embodiment 7 of the present invention. FIG. 14 is a block diagram showing the configuration of a graphic image rendering apparatus using an internal memory in accordance with Embodiment 7.

In FIG. 14, the texture memory 2, the frame memory 5, the pixel information generation portion 7, the first pixel calculation portion 53, the first pixel mode signal 54, the second pixel calculation portion 55 and the second calculation mode signal 56 are similar to the ones described in Embodiment 6 (see FIG. 12).

A first working memory 60 and a second working memory 61 are memories for respectively storing the pixel data of intermediate calculation results and final calculation results for different graphic images, and the smallest coordinate point of a rectangle circumscribing the rendered graphic image is taken as the origin of the coordinate system. Furthermore, it is sufficient if the first working memory 60 and the second working memory 61 store the pixel data of the rectangular region circumscribing the maximum graphic image, like the working memory 52 of Embodiment 6, and they are therefore internal memories of low capacity.

A first offset 62 is the smallest X and Y coordinate values of the rectangle circumscribing the graphic image when rendering with the first working memory 60, and is the amount of parallel shift from the origin.

A second offset 63 is the smallest X and Y coordinate values of the rectangle circumscribing the graphic image when rendering with the second working memory 61, and is the amount of parallel shift from the origin.

When processing the first working memory 60, a working memory interface portion 64 reads from the first working memory 60 the working data at the locations corresponding to the X and Y coordinates obtained by subtracting the X and Y values of the first offset 62 from the X and Y coordinates that are output by the pixel information generation portion 7, and writes second pixel data into the first working memory 60.

When processing the second working memory 61, the working memory interface portion 64 reads from the second working memory 61 the working data at the locations corresponding to the X and Y coordinates obtained by subtracting the X and Y values of the second offset 63 from the X and Y coordinates that are output by the pixel information generation portion 7, and writes second pixel data into the second working memory 61.

Here, the reason why the X and Y coordinates obtained by subtracting the X and Y values of the first offset 60 and the second offset 61 from the X and Y coordinates that are output by the pixel information generation portion 7 are used is, as in Embodiment 6, so as to convert the coordinates in the frame memory 5 into the coordinates in the first working memory 60 and the second working memory 61. The above processing is performed when carrying out the calculation of the graphic image.

Furthermore, the working memory interface portion 64 writes into the first working memory 60 or the second working memory 61 all frame data in the rectangular region circumscribing the rendered graphic image that have been read out from the frame memory 5. During that, the smallest coordinates of the region of the circumscribing rectangle are taken as the origin.

The working memory interface portion 64 also reads out from the first working memory 60 or the second working memory 61 all working data in the rectangular region circumscribing the graphic image for which the calculation has been terminated, and sends them to the frame memory interface portion.

The working memory interface portion 64 simultaneously uses separate working memories for the working memory used to process when executing the calculation of the graphic image and the working memory used to process the region of the circumscribing rectangle.

The frame memory interface portion 65 reads out from the frame memory 5 all frame data in the rectangular region circumscribing the rendered graphic image, and sends them to the working memory interface portion 64.

The frame memory interface portion 65 also writes into the rendering position of the frame memory 5 all frame data in the rectangular region circumscribing the graphic image which have been read out from the first working memory 60 and the second working memory 61 and for which the calculation has been terminated.

A rectangle transfer control portion 66 controls the working memory interface portion 64 and the frame memory interface portion 65 with regard to the transfer of the rectangular region circumscribing the graphic image, and determines the allocation of the rendering calculation process and the circumscribing rectangle transfer process to the first working memory 60 and the second working memory 61.

Figure 15:
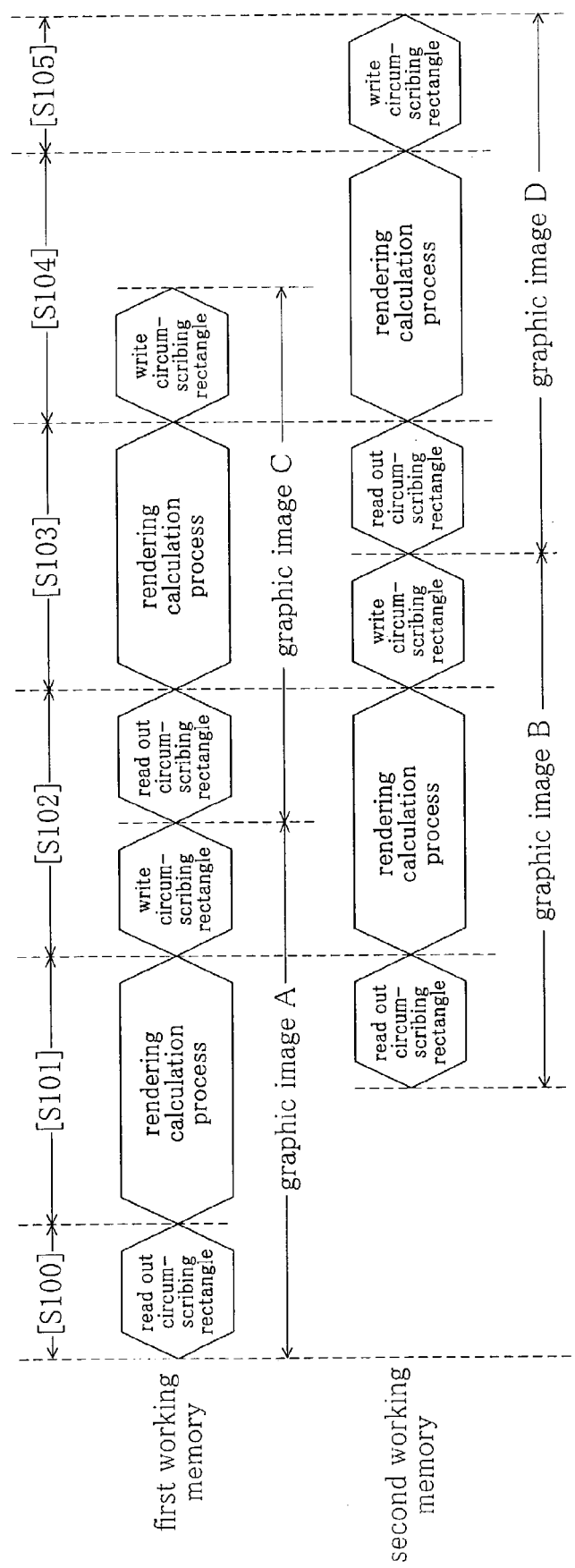
FIG. 15 illustrates the operation timing in Embodiment 7 of the present invention.

The following is a explanation of the operation of Embodiment 7. FIG. 15 is a diagram illustrating the operation timing when rendering four different graphic images A to D with a graphic image rendering apparatus according to Embodiment 7.

The timing chart in the upper half of FIG. 15 illustrates the processing for the first working memory 60, whereas the timing chart in the lower half of FIG. 15 illustrates the processing for the second working memory 61. The following is an explanation of those timing charts.

At [S100], the frame data for the rectangular region circumscribing the graphic image A at the position where the graphic image A is to be rendered are read out from the frame memory 5 and written into the first working memory 60.

At [S101], a rendering calculation process for the graphic image A is performed using the first working memory 60. Parallel thereto, the frame data for the rectangular region circumscribing the graphic image B at the position where the graphic image B is to be rendered are read out from the frame memory 5 and written into the second working memory 61.

The final calculation result for the graphic image A is written into the first working memory 60, and after the frame data have been written into the second working memory 61, the procedure advances to [S102].

At [S102], a rendering calculation process for the graphic image B is performed using the second working memory 61. Parallel thereto, all working data at the rectangular region circumscribing the graphic image A for which the calculation has been terminated are read from the first working memory 60 and written into the rendering position of the frame memory 5, thus finishing the rendering of the graphic image A.

After that, the frame data for the rectangular region circumscribing the graphic image C at the position where the graphic image C is to be rendered are read out from the frame memory 5 and written into the first working memory 60.

The final calculation result for the graphic image B is written into the second working memory 61, and after the frame data have been written into the first working memory 60, the procedure advances to [S103].

At [S103], a rendering calculation process for the graphic image C is performed using the first working memory 60. Parallel thereto, all working data at the rectangular region circumscribing the graphic image B for which the calculation has been terminated are read from the second working memory 61 and written into the rendering position of the frame memory 5, thus finishing the rendering of the graphic image B.

After that, the frame data for the rectangular region circumscribing the graphic image D at the position where the graphic image D is to be rendered are read out from the frame memory 5 and written into the second working memory 61.

The final calculation result for the graphic image C is written into the first working memory 60, and after the frame data have been written into the second working memory 61, the procedure advances to [S104].

At [S104], a rendering calculation process for the graphic image D is performed using the second working memory 61. Parallel thereto, all working data at the rectangular region circumscribing the graphic image C for which the calculation has been terminated are read from the first working memory 60 and written into the rendering position of the frame memory 5, thus finishing the rendering of the graphic image C.

The final calculation result for the graphic image D is written into the second working memory 61, and after the working data of the graphic image C have been written into the frame memory 5, the procedure advances to [S105].

At [S105], all working data at the rectangular region circumscribing the graphic image D for which the calculation has been terminated are read from the second working memory 61 and written into the rendering position of the frame memory 5, thus finishing the rendering of the graphic image D.

With this configuration, when rendering a plurality of graphic images, the calculation for one graphic image is performed with a high-speed working memory up to the last stage, and parallel thereto transfer to a low-speed frame memory is performed for a separate graphic image, so that a plurality of graphic images can be rendered at high speed.

Furthermore, in a configuration with three or more stages of calculation circuits, the calculation result of the previous stages may be reflected in the calculations of the latter stages, the working data of the first working memory 60 and the second working memory 61 may be reflected by the respective calculation circuits, and the calculation result of the last stage may be written into the first working memory 60 and the second working memory 61.

If the circumscribing rectangles of two graphic images to be rendered successively overlap, then the rendering result of the first graphic image cannot be reflected in the calculation of the second graphic image, and in this case it may be determined beforehand whether the circumscribing rectangles of the two graphic images to be rendered successively overlap, and if they do, the latter graphic image may be moved down in the rendering order of the graphic images so that the rectangles circumscribing two graphic images to be rendered successively do not overlap.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A graphic image rendering apparatus comprising:
a working memory, which is an internal memory;
a rendering information generation portion that generates rendering parameters corresponding to X and Y coordinates of pixels constituting a graphic image;
a plurality of pixel calculation portions that, in a first stage, for each pixel make a selection as appropriate from the rendering parameters, a constant and working data, which are pixel data in a working memory that correspond to coordinates of a pixel currently processed, to perform a calculation, and in stages following the first stage make a selection as appropriate from the rendering parameters, the constant, a calculation result of the prior stage(s) and the working data to perform a calculation;
a working memory interface portion that reads the working data from the working memory and writes a calculation result of the pixel calculation portion of the last stage into the working memory; and
a frame memory interface portion that writes only a calculation result of the pixel calculation portion of the last stage into the frame memory,
wherein the smallest X and Y coordinates of a rectangle circumscribing the graphic image to be rendered are taken as an origin in the working memory, and the working memory interface portion accesses the working memory after converting coordinates of the frame memory into coordinates of the working memory.

2. A graphic image rendering apparatus comprising:
a working memory, which is an internal memory;
a rendering information generation portion that generates rendering parameters corresponding to IX and Y coordinates of pixels constituting a graphic image;
a plurality of pixel calculation portions that, in a first stage, for each pixel make a selection as appropriate from the rendering parameters, a constant and working data, which are pixel data in a working memory that correspond to coordinates of a pixel currently processed, to perform a calculation, and in stages following the first stage make a selection as appropriate from the rendering parameters, the constant, a calculation result of the prior stage(s) and the working data to perform a calculation;
a working memory interface portion that reads the working data from the working memory and writes a calculation result of the pixel calculation portion of the last stage into the working memory; and
a frame memory interface portion that writes only a calculation result of the pixel calculation portion of the last stage into the frame memory,
wherein, when using frame data for a calculation before rendering the image, then before starting the rendering of the graphic image the frame data of a region of a rectangle circumscribing the graphic image to be rendered are transferred in advance from the frame memory to the working memory.

3. A graphic image rendering apparatus comprising:
a first and a second working memory, which are internal memories;
a rendering information generation portion that generates rendering parameters corresponding to X and Y coordinates of pixels constituting a graphic image;
a plurality of pixel calculation portions that, in a first stage, for each pixel make a selection as appropriate from the rendering parameters, a constant and working data from the first and second working memory to perform a calculation, and in stages following the first stage make a selection as appropriate from the rendering parameters, the constant, a calculation result of the prior stage(s) and the working data to perform a calculation;
a working memory interface portion that, while a rendering calculation process by the plurality of pixel calculation portions is performed, reads the working data from the first or second working memory, writes a calculation result of the pixel calculation portion of the last stage into the first or second working memory, and in parallel to the rendering calculation process, writes into the first or the second working memory all frame data in a rectangular region circumscribing the graphic image to be rendered than have been read from a frame memory, and reads from the first or the second working memory all working data in a rectangular region circumscribing the graphic image for which calculation has been finished;
a frame memory interface portion that reads from the frame memory all frame data in the rectangular region circumscribing the graphic image to be rendered, and writes into a rendering position of the frame memory all working data in the rectangular region circumscribing the graphic image that have been read from the first or second working memory and for which calculation has been finished; and
a rectangle transfer control portion that controls the working memory interface portion or the frame memory interface portion with regard to transferring the rectangular region circumscribing the graphic image, and determines the allocation of a transfer process accompanied by the rendering calculation process and the circumscribing rectangle transfer with regard to the first and second working memories.

4. The graphic image rendering apparatus according to claim 3, wherein, when rendering with more calculation stages than there are stages of pixel calculation portions, first a result calculated by the number of stages of pixel calculation portions is built up in the first or second working memory, and then an additional calculation is performed on the calculation result of up to the previous stage by reflecting in each pixel calculation portion the working data at the same rendering position.

5. The graphic image rendering apparatus according to claim 3, wherein, when using the first working memory, the smallest X and Y coordinates of the rectangle circumscribing the graphic image to be rendered are taken as an origin of the first working memory and the working memory interface portion accesses the first working memory after converting coordinates of the frame memory into coordinates of the first working memory, and when using the second working memory, the smallest X and Y coordinates of the rectangle circumscribing the graphic image to be rendered are taken as an origin of the second working memory, and the working memory interface portion accesses the second working memory after converting coordinates of the frame memory into coordinates of the second working memory.

6. The graphic image rendering apparatus according to claim 3, wherein it is determined in advance whether the rectangles circumscribing two graphic images to be rendered successively overlap, and if they overlap, the latter graphic image is moved down in the rendering order so that the rectangles circumscribing two graphic images to be rendered successively do not overlap.

7. The graphic image rendering apparatus according to claim 3, further comprising a calculation mode signal supply portion that supplies to the pixel calculation portion(s) a calculation mode signal for selecting the parameters that the pixel calculation portion(s) use for their calculation, based on a rendering command encoded for each rendering function.

* * * * *

UNITED STATES PATENT AND TRADEMARK OFFICE
CERTIFICATE OF CORRECTION

PATENT NO.     : 6,965,382 B2  Page 1 of 1
DATED          : November 15, 2005
INVENTOR(S)    : Satoshi Shigenaga It is certified that error appears in the above-identified patent and that said Letters Patent is hereby corrected as shown below:

<u>Title page,</u>
Item [75], Inventor, change "Osaka" to -- Kyoto --.

Signed and Sealed this

Second Day of May, 2006

JON W. DUDAS
*Director of the United States Patent and Trademark Office*